United States Patent
Sommer et al.

(10) Patent No.: US 11,976,168 B2
(45) Date of Patent: May 7, 2024

(54) BINDER COMPOSITION COMPRISING POLY(AMINO ACID)S FOR FIBER COMPOSITE ARTICLES

(71) Applicant: BASF SE, Ludwigshafen am Rhein (DE)

(72) Inventors: Gereon Antonius Sommer, Ludwigshafen am Rhein (DE); Stephan Weinkoetz, Ludwigshafen am Rhein (DE); David Tuerp, Ludwigshafen am Rhein (DE); Guenter Scherr, Ludwigshafen am Rhein (DE); Jessica Nadine Hamann, Ludwigshafen am Rhein (DE); Joaquim Henrique Teles, Ludwigshafen am Rhein (DE); Ralph Lunkwitz, Ludwigshafen am Rhein (DE); Thomas Servay, Ludwigshafen am Rhein (DE); Jean-Pierre Berkan Lindner, Ludwigshafen am Rhein (DE); Dagmar Pascale Kunsmann-Keitel, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/269,028

(22) PCT Filed: Dec. 22, 2021

(86) PCT No.: PCT/EP2021/087427
§ 371 (c)(1),
(2) Date: Jun. 22, 2023

(87) PCT Pub. No.: WO2022/136612
PCT Pub. Date: Jun. 30, 2022

(65) Prior Publication Data
US 2024/0043617 A1    Feb. 8, 2024

(30) Foreign Application Priority Data

Dec. 23, 2020  (EP) ..................................... 20216812
Dec. 23, 2020  (EP) ..................................... 20216816

(51) Int. Cl.
*C08G 69/10*  (2006.01)
*B27N 3/00*   (2006.01)
(Continued)

(52) U.S. Cl.
CPC ............. *C08G 69/10* (2013.01); *B27N 3/002* (2013.01); *B27N 3/04* (2013.01); *C08K 5/07* (2013.01); *C08K 5/1545* (2013.01); *C08L 97/02* (2013.01)

(58) Field of Classification Search
CPC ....................................................... C08G 69/10
(Continued)

(56) References Cited

U.S. PATENT DOCUMENTS 5,410,089 A    4/1995 Gehrer et al.
5,508,422 A    4/1996 Teles et al.
(Continued)

FOREIGN PATENT DOCUMENTS

EP    0568872 A1    11/1993
EP    0786456 A2     7/1997
(Continued)

OTHER PUBLICATIONS

Machine_English_translation_WO_2018190662_A2; Back, Binder Compostion, Article, and Method for Manufacturing Article, Oct. 2018; WIPO; whole document (Year: 2018).*
(Continued)

*Primary Examiner* — Tahseen Khan
(74) *Attorney, Agent, or Firm* — Faegre Drinker Biddle & Reath LLP

(57) ABSTRACT

The present invention relates to a binder composition comprising component A comprising polymer(s) A1 and option-
(Continued)

ally component B comprising component B1 which is selected from the group consisting of a mono-saccharide s, disaccharides, hydroxyacetone, glycolaldehyde and mixtures thereof, wherein polymer(s) A1 comprises at least 70 wt.-% poly(amino acid)s based on the total weight of the polymers) A1 and has (have) a total weight average molecular weight $M_{w,total}$ of 800 g/mol to 10.000 g/mol, wherein the binder composition comprises 60 to 100 wt.-% polymer(s) A1, and 0 to 40 wt.-% component B1, based on the total weight of the sum of polymer(s) A1 and component B1, wherein the weight amounts of the polymer(s) A1 and component B1 are selected such that the total weight of the sum of polymer(s) A1 and component B1 is 100 wt.-%.

13 Claims, 1 Drawing Sheet

(51) Int. Cl.
 B27N 3/04 (2006.01)
 C08K 5/07 (2006.01)
 C08K 5/1545 (2006.01)
 C08L 97/02 (2006.01)
(58) Field of Classification Search
 USPC .......................................................... 428/220
 See application file for complete search history.

(56) References Cited

U.S. PATENT DOCUMENTS

| | | | |
|---|---|---|---|
| 2011/0262648 | A1 | 10/2011 | Lee et al. |
| 2016/0257815 | A1* | 9/2016 | Varnell .................. C08L 97/02 |
| 2017/0210952 | A1* | 7/2017 | Hampson ............... C09J 131/04 |
| 2020/0157344 | A1 | 5/2020 | Kim et al. |

FOREIGN PATENT DOCUMENTS

| | | | |
|---|---|---|---|
| EP | 2386605 | A1 | 11/2011 |
| EP | 3080178 | A1 | 10/2016 |
| EP | 3611225 | A2 | 2/2020 |
| WO | 2007/060119 | A1 | 5/2007 |
| WO | 2011/138458 | A1 | 11/2011 |
| WO | 2015/086074 | A1 | 6/2015 |
| WO | 2015/177114 | A1 | 11/2015 |
| WO | 2016/009062 | A1 | 1/2016 |
| WO | 2016/062578 | A1 | 4/2016 |
| WO | 2018/190662 | A2 | 10/2018 |
| WO | WO-2018190662 | A2 * | 10/2018 ............. C08G 69/08 |

OTHER PUBLICATIONS

International Preliminary Report on Patentability received for PCT Patent Application No. PCT/EP2021/087427, dated Mar. 17, 2023, 5 pages.
International Search Report and Written Opinion received for PCT Patent Application No. PCT/EP2021/087427, dated Apr. 5, 2022, 10 pages.
Bajpai, P., "Pulp and handsheets of overthick (left) chips, accept chips (center), and fine chips (right) after kraft pulping," Biermann's Handbook of Pulp and Paper (Third Edition), vol. 1—Raw Material and Pulp Making, Chapter 12—Pulping Fundamentals, Sep. 21, 2018, pp. 295.
Brunnmuller, F., "Aminoplaste," Verlag Chemie, Ullmanns Encyklopadie der technischen Chemie, Band 7, 4th edition, 1973, pp. 403-424.
Deppe et al., "MDF—Mitteldichte Faserplatten, Chapter 4—Fertigungstechmologie," DRV-Verlag, 1996, pp. 43-46.
Deppe et al., "MDF—Mitteldichte Faserplatten, Chapter 4.5—Pressen," DRV-Verlag, 1996, pp. 93-104.
Deppe et al., "Taschenbuch der Spanplattentechnik, Chapter 3.5—Verpressung," DRV-Verlag, 1977, pp. 232-254.
Diem et al., "Amino Resins," Ullmanns Encyklopadie der technischen Chemie, vol. A2, 1985, pp. 115-141.
Dunky et al., "EinfluB der SpangroBenverteilung auf den Beleimungsgrad der Spane," Holzforschung und Holzverwertung, vol. 40, Dec. 1988, pp. 126-133.
Dunky et al., "Holzwerkstoffe und Leime Technologie und Einflussfaktoren," 2002, pp. 965.
Franke et al., "Polyurethane—Kunststoff Handbuch 7, Chapter 12—Polyurethansysteme und Polyisocyanate als Ausgangsstoffe für Bindemittel," Hanser, Carl, 3rd Edition, vol. 7, 1993, pp. 665-671.
Frey et al., "Delignified and Densified Cellulose Bulk Materials with Excellent Tensile Properties for Sustainable Engineering," ACS Applied Materials & Interfaces, vol. 10, No. 5, Jan. 26, 2018, 5030-5037.
Gardziella et al., "Duroplaste—Kunststoff Handbuch 10, Chapter 1.2.2—Phenolharze (PF)," Hanser, Carl, 2nd Edition, vol. 10, 1988, pp. 12-40.
Hahn, W., "Polyurethane—Kunststoff Handbuch 7, Chapter 2.2—Wichtige Aufbaukomponenten für Polyurethane," Hanser, Carl, 3rd Edition, vol. 7, 1993, pp. 17-21.
Meyer et al., "Gas pressure measurements during continuous hot pressing of particleboard," Holz als Roh-und Werkstoff vol. vol. 65, Aug. 26, 2006, pp. 49-55.
Niemz et al., "2.4.4 Werkstoffe auf Spanbasis,"Chapter 2: Werkstoffe aus Holz, Taschenbuch der Holztechnik, Jun. 2012, pp. 206-230.
Niemz et al., "Chapter 2—Werkstoffe aus Holz," Taschenbuch der Holztechnik, Jun. 2012, pp. 127-259.
Preussmann et al. "Untersuchungen zum Nachweis alkylierender Agentien, I Spektrophotometrische Bestimmung von Diazoalkanen mit 4-[4-Nitro-benzyl]-pyridinium-perchlorat," Justus Liebigs Annalen der Chemie, vol. 684, Issue 1, May 1, 1965, pp. 57-61.
Schauerte et al., "Polyurethane—Kunststoff Handbuch 7, Chapter 3.2—Isocyanate," Hanser, Carl, 3rd Edition, vol. 7, 1993, pp. 76-88.
Schömer et al., "Hyperbranched aliphatic polyether polyols," Journal of Polymer Science, Part A: Polymer Chemistry, vol. 51, Issue 5, Mar. 1, 2013, pp. 995-1019.
Steuerle et al., "Aziridines," Ullmann's Encyclopedia of Industrial Chemistry, vol. 4, 2012, pp. 515-521.
Thoemen et al., "Wood-Based Panels, An Introduction for Specialists," Brunel University Press, 2010, pp. 152.
Thoemen, H., "Vom Holz zum Werkstoff—Grundlegende Untersuchungen zur Herstellung und Struktur von Holzwerkstoffen," Berner Fachhochschule Architektur, Holz und Bau, 2010, pp. 76.
Zhu et al., "Highly Anisotropic, Highly Transparent Wood Composites," Advanced Materials, vol. 28, Issue 26, Jul. 13, 2016, pp. 5181-5187.

* cited by examiner

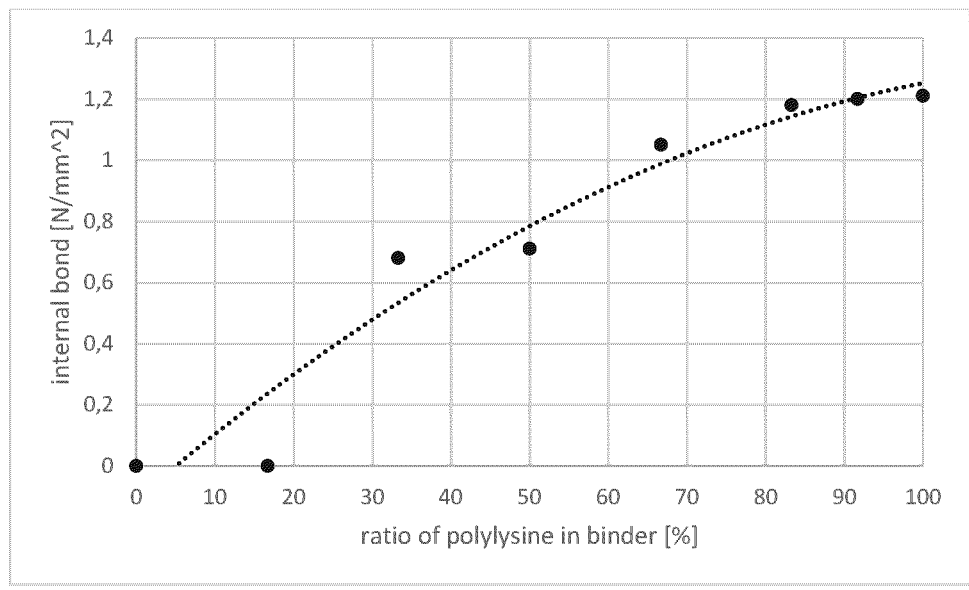

BINDER COMPOSITION COMPRISING POLY(AMINO ACID)S FOR FIBER COMPOSITE ARTICLES

CROSS-REFERENCE TO RELATED APPLICATIONS

This application is a National stage application (under 35 U.S.C. § 371) of PCT/EP2021/087427, filed Dec. 22, 2021, which claims benefit of European Application Nos. 20216812.6 and 20216816.7, both filed Dec. 23, 2020, all of which are incorporated herein by reference in their entirety.

The present invention relates to a binder composition comprising
- component A comprising polymer(s) A1 and
- optionally component B comprising component B1 which is selected from the group consisting of monosaccharides, disaccharides, hydroxyacetone, glycolaldehyde and mixtures thereof,
- wherein polymer(s) A1 comprises at least 70 wt.-% poly(amino acid)s based on the total weight of the polymer(s) A1 and
- has(have) a total weight average molecular weight $M_{w,total}$ of 800 g/mol to 10,000 g/mol, wherein the binder composition comprises
- 60 to 100 wt.-% polymer(s) A1, and 0 to 40 wt.-% component B1,
- based on the total weight of the sum of polymer(s) A1 and component B1, wherein the weight amounts of the polymer(s) A1 and component B1 are selected such that the total weight of the sum of polymer(s) A1 and component B1 is 100 wt.-%.

Further, the present invention relates to a composition kit for the preparation of lignocellulose-based fiber boards comprising the binder composition, wherein component A and component B are stored separately, and to lignocellulose-based fiber boards comprising a plurality of lignocellulosic fibers and the reacted binder composition. Moreover, the present invention relates to processes of forming lignocellulose-based fiber boards comprising the reacted binder composition.

Lignocellulose-based composite articles, such as oriented strand board (OSB), oriented strand lumber, chipboard, also called particleboard, scrimber, agrifiber board, flakeboard, and fiberboard, e.g. medium density fiberboard (MDF), are generally produced by blending or spraying lignocellulosic pieces with a binder composition, e.g. a resin, while the lignocellulosic pieces are tumbled or agitated in a blender or similar apparatus. After blending sufficiently to form a binder composition-lignocellulose mixture, the lignocellulosic pieces, which are coated with the binder composition, are formed into a product, in particular a loose mat, which is subsequently compressed between heated platens or plates to set the binder composition and to bond these lignocellulosic pieces together in densified form, such as in a board, panel, or other shape. Conventional processes for compressing the loose mat are generally carried out by hot pressing along with heat transfer from hot surfaces (usually between 180° C. and 240° C.) to the mat, in the presence of varying amounts of steam, either purposefully injected into the loose mat or generated by liberation of entrained moisture from the lignocellulosic pieces or the binder composition in the loose mat.

Binder compositions that have been used for making such lignocellulose-based composite articles include phenol formaldehyde (PF) resins, urea formaldehyde (UF) resins, melamine urea formaldehyde (MUF) resins and isocyanates (M. Dunky, P. Niemz, Holzwerkstoffe und Leime, Springer Verlag Heidelberg, 2002, pages 249 to 367). From an environmental perspective there is the need to provide binder compositions which are formaldehyde-free and isocyanate-free and still have excellent properties.

Carbohydrate-based binder compositions are mainly derived from renewable resources. They require press conditions which are quite different from the traditional phenol-formaldehyde binder composition, urea formaldehyde or isocyanate resins. Carbohydrate polyamine binder compositions can substitute said traditional binder compositions. However, carbohydrate polyamine binder composition solutions are asso-ciated with a variety of disadvantages such as large binder composition amounts, long press times and poor structural properties of the resulting boards. WO2015177114 describes a binder composition for wood boards comprising a reaction product of lysine and a carbohydrate component, but the obtained wood boards have low internal bond strengths even at long press times. WO2016009062 describes a binder composition comprising a carbohydrate and a polyamine and a matrix polymer. However, such binder compositions for chipboards require long press times and result in chipboards with a low internal bond strength and an insufficient swelling value in water. EP3611225 describes a fiber board comprising polylysine and reducing sugar binders with reduced formaldehyde emission. However, said binder is not suited to prepare thin fiber boards with good mechanical properties and good low swelling values.

It is an object of the invention to provide a binder composition, in particular for lignocellulose-based fiber boards, which comprises reduced amounts of formaldehyde and/or isocyanate or is formaldehyde-free and/or isocyanate-free, and which provides good mechanical properties to the fiber boards. In particular, it is an object of the invention to provide binder compositions which require low binder composition amounts and/or short press times to achieve lignocellulose-based fiber boards with good mechanical properties and/or swelling values, even for thin plates and/or boards.

This object is achieved by a binder composition, preferably a wood binder composition, comprising
- component A comprising polymer(s) A1 and
- optionally component B comprising component B1 which is selected from the group consisting of monosaccharides, disaccharides, hydroxyacetone, glycolaldehyde and mixtures thereof,
- wherein polymer(s) A1 comprises at least 70 wt.-% poly(amino acid)s based on the total weight of the polymer(s) A1 and
- has(have) a total weight average molecular weight $M_{w,total}$ of 800 g/mol to 10.000 g/mol, wherein the binder composition comprises
- 60 to 100 wt.-% polymer(s) A1, and 0 to 40 wt.-% component B1,
- based on the total weight of the sum of polymer(s) A1 and component B1, wherein the weight amounts of the polymer(s) A1 and component B1 are selected such that the total weight of the sum of polymer(s) A1 and component B1 does not exceed 100 wt.-% or is 100 wt.-%.

Binder composition means component A and component B and optionally any further component prior to reacting. Optionally, the binder composition does not comprise any component B.

The binder composition may be cured by heating, which may be carried out by contact heating and/or heat transfer from hot air and/or steam and/or dielectric heating (e.g microwave heating, or high frequency heating) to obtain the reacted binder composition. The binder composition may be cured by applying heat and optionally pressure at the same time or subsequently to obtain the reacted binder composition. The reacted binder composition means the cured binder composition. The reacted binder composition is obtainable or may be obtained by reacting the binder components A and B. The reacted binder composition is obtainable or may be obtained by reacting the binder component A with components of the lignocellulosic fibers and optionally binder component B.

Optionally, component A comprises polymer(s) A1 having primary and/or secondary amino groups wherein polymer(s) A1 has(have) a primary and secondary amine group nitrogen content of at least 1 wt.-%.

The term primary and/or secondary amino groups as used according to the present invention does not include amide-groups such as e.g. R—CO—$NH_2$ and/or R—CO—NH—R.

Component B1 may comprise monosaccharides having the formula $C_nH_{2n}O_n$ (polyhydroxyaldehydes (al-doses) and/or polyhydroxyketones (ketoses) and/or disaccharides having the formula $C_nH_{2n-2}O_{n-1}$ and mixtures thereof.

Component B1 may comprise or be one or two or more monosaccharides in its aldose or ketose form or a mixture of different types, including trioses, tetroses, pentoses, hexoses, or heptose; or disaccharides, or combinations thereof.

For example, when a triose serves as monosaccharide, glyceralaldehyd and/or dihydroxyacetone may be utilized. When a tetrose serves as monosaccharide aldotetrose sugars, such as erythrose and/or threose may be utilized; and/or ketotetrose sugars, such as erythrulose, may be utilized. When a pentose serves as monosaccharide, aldopentose sugars, such as ribose, arabinose, xylose, and/or lyxose may be utilized; and/or ketopentose sugars, such as ribulose, arabulose, xylulose, and/or lyxulose, may be utilized. When a hexose serves as monosaccharide, aldohexose sugars, such as glucose (i.e., dextrose), mannose, galactose, allose, altrose, talose, gulose, and/or idose may be utilized; and/or ketohexose sugars, such as fructose, psicose, sorbose and/or tagatose, may be utilized. When a heptose serves as monosaccharide, a ketoheptose sugar such as sedoheptulose may be utilized. Other stereoisomers of such monosaccharides not known to occur naturally are also contemplated to be useful as component B1 of component B.

Optionally the monosaccharide and/or disaccharide is selected from the group consisting of ribose, arabinose, xylose, lyxose, glucose (i.e., dextrose), mannose, galactose, allose, altrose, talose, gulose, idose, fructose, psicose, sorbose, sucrose and tagatose, as well as mixtures thereof. More preferably, the monosaccharide and/or disaccharide is selected from the group consisting of xylose, glucose (i.e. dextrose), fructose and sucrose, as well as mixtures thereof.

Optionally, component B1 comprises or consists of hydroxyacetone, 1,3-dihydroxyacetone, glycolaldehyde, glyceraldehyde, xylose, fructose, glucose, mannose, saccharose (i.e. sucrose) or mixtures thereof. Optionally, component B1 comprises or consists of xylose, fructose, glucose, saccharose (i.e. sucrose) or mixtures thereof. Optionally, component B1 comprises or consists of fructose and/or glucose and/or saccharose.

Optionally, component B1 is a mixture comprising
40 to 60 wt.-% glucose,
60 to 40 wt.-% fructose,
based on the total weight of component B1, wherein the weight amounts of glucose and fructose are selected such that the total weight of the sum of glucose and fructose does not exceed 100 wt.-%.

Optionally, component B1 is a mixture consisting of
40 to 60 wt.-% glucose,
60 to 40 wt.-% fructose,
based on the total weight of component B1, wherein the weight amounts of glucose and fructose are selected such that the total weight of the sum of glucose and fructose is 100 wt.-%.

Optionally, component B1 is a mixture comprising
30 to 70 wt.-% glucose, preferably 40 to 60 wt.-% glucose,
30 to 70 wt.-% fructose, preferably 40 to 60 wt.-% fructose,
and 0 to 40 wt.-% sucrose, preferably 0 to 20 wt.-% sucrose,
based on the total weight of component B1, wherein the weight amounts of glucose and fructose and sucrose are selected such that the total weight of the sum of glucose, fructose and sucrose does not exceed 100 wt.-%.

Optionally, component B1 is a mixture consisting of
30 to 70 wt.-% glucose, preferably 40 to 60 wt.-% glucose,
30 to 70 wt.-% fructose, preferably 40 to 60 wt.-% fructose,
and 0 to 40 wt.-% sucrose, preferably 0 to 20 wt.-% sucrose,
based on the total weight of component B1, wherein the weight amounts of glucose and fructose and sucrose are selected such that the total weight of the sum of glucose, fructose and sucrose is 100 wt.-%.

Optionally, component B1 comprises
0 to 30 wt.-% glucose, preferably 0 to 10 wt.-% glucose
0 to 30 wt.-% fructose, preferably 0 to 10 wt.-% fructose and
70 to 100 wt.-% sucrose, preferably 90 to 100 wt-% sucrose
based on the total weight of component B1, wherein the weight amounts of glucose and fructose and sucrose are selected such that the total weight of the sum of glucose, fructose and sucrose does not exceed 100 wt.-%.

Optionally, component B1 consists of
0 to 30 wt.-% glucose, preferably 0 to 10 wt.-% glucose,
0 to 30 wt.-% fructose, preferably 0 to 10 wt.-% fructose and
70 to 100 wt.-% sucrose, preferably 90 to 100 wt-% sucrose.
based on the total weight of component B1, wherein the weight amounts of glucose and fructose and sucrose are selected such that the total weight of the sum of glucose, fructose and sucrose is 100 wt.-%.

Reacting or reacted means that polymer(s) A1 react(s) with component B1 and/or with components of the lignocellulosic fibers. Besides, further components may also react with polymer(s) A1 and/or component B1. The reaction may lead to crosslinked polymers.

Optionally reacting or reacted means that polymer(s) A1 react(s) with component B1 and/or with components of the lignocellulosic fibers and
optionally polymer(s) A1 react(s) with component B2 and
optionally polymer(s) A1 react(s) with themselves(itself) and
optionally component B1 reacts with each component itself and/or with each other,
optionally component B1 reacts with component B2.

Component B2 is further explained below.

Component A may comprise 20 to 80 wt.-%, preferably 30 to 70 wt.-%, preferably 40 to 65 wt.-% of the polymer(s) A1 based on the total weight of component A.

The binder composition according to the present invention may comprise at least 70 wt.-%, at least 80 wt.-%, at least 85 wt.-%, at least 90 wt.-%, at least 95, at least 98 wt.-%, at least 99 wt.-% or at least 99.9 wt.-% and at most 85 wt.-%, at most 90 wt.-%, at most 95 wt.-%, or up to 100 wt.-% polymer(s) A1, based on the total weight of the sum of polymer(s) A1 and component B1. Optionally, no component B1, preferably no component B1 is used.

Advantageously, the components A and B are not provided as a mixture, and this allows easy transportation and long storage for several months. Therefore, according to one aspect of the present invention, the binder composition may be provided as a kit, wherein Component A and Component B are stored separately.

Components A and B may be brought into contact either directly on the lignocellulosic fibers, preferably made from wood, or by mixing them before the application to the lignocellulosic fibers, preferably made from wood.

Component A and/or B may be provided in the form of an aqueous solution or dispersion.

wt.-% means weight-%.

Component A:

Polymer(s) A1:

Component A may comprise one polymer A1 having primary and/or secondary amino groups or different polymers A1 having primary and/or secondary amino groups, wherein polymer(s) A1 preferably has(have) a primary and secondary amine nitrogen content ($NC_{ps}$) of at least 1 wt.-%.

Polymer A1 is a polymerization product of one or of several monomers. The term "polymer" is used for such polymerization product, even if the polymerization reaction is not run to completion. Polymer A1 may consist of dimers (n=2), trimers (n=3), oligomers (n=4–10) and macromolecules (n>10)—wherein n is the number of monomers which have been reacted to form the dimers, trimers, oligomers and macromolecules—and may also include monomers. These monomers may be present due to incomplete conversion of the monomers during the polymerization reaction and/or due to an addition of additional monomers after finishing the polymerization reaction, wherein the additional monomers are selected from the group of the monomers, which have been used for the polymerization reaction. Preferably, no monomers are added after finishing the polymerization reaction.

The primary amine nitrogen content ($NC_p$) is the content of nitrogen in wt.-% nitrogen which corresponds to the primary amine groups in polymer(s) A1. The secondary amine nitrogen content ($NC_s$) is the content of nitrogen in wt.-% nitrogen which corresponds to the secondary amine groups in polymer(s) A1. The primary and secondary amine group nitrogen content of the polymer(s) A1 ($NC_{ps}$) is calculated using the following equation:

$$NC_{ps}=NC_p+NC_s$$

The primary amino group nitrogen content ($NC_p$) and the secondary amino group nitrogen content ($NC_s$) can be measured based on EN ISO 9702:1998 (determination of primary, secondary and tertiary amino group nitrogen content).

The wording "polymer(s) A1 has(have) a primary and secondary amine group nitrogen content ($NC_{ps}$) of at least 1 wt.-%" means the following:

If polymer(s) A1 consist(s) of one polymer having primary and/or secondary amino groups, this polymer A1 has a $NC_{ps}$ of at least 1 wt.-%, or if polymer(s) A1 consist of different polymers having primary and/or secondary amino groups, these polymers A1 in total have a $NC_{ps}$ of at least 1 wt.-%.

Optionally polymer(s) A1 has(have) a $NC_{ps}$ of at least 1 wt.-%, preferably 3 wt.-%, preferably at least 5 wt.-%, more preferably at least 7 wt.-% and optionally at least one polymer of polymers A1, preferably each polymer A1, has a $NC_{ps}$ of at least 1 wt.-%, preferably at least 3 wt.-%, preferably at least 5 wt.-%, more preferably at least 7 wt.-%.

Optionally polymer(s) A1 has(have) a $NC_{ps}$ from 1 to 33 wt.-%, preferably from 3 to 30 wt.-%, preferably from 5 to 25 wt.-%, preferably from 7 to 20 wt.-% and optionally at least one polymer of polymer(s) A1, preferably each polymer A1, has a $NC_{ps}$ from 1 to 33 wt.-%, preferably from 3 to 30 wt.-%, preferably from 5 to 25 wt.-%, preferably from 7 to 20 wt.-%.

In case component A comprises one polymer A1, this polymer A1 has a weight-average molecular weight $M_w$ of at least 800 g/mol, preferably at least 1,000 g/mol, more preferably at least 1,400 g/mol, more preferably at least 2,400 g/mol, most preferably at least 3,000 g/mol and preferably at most 10,000 g/mol, more preferably at most 5,000 g/mol.

In case component A comprises different polymers A1, these polymers A1 have a total weight-average molecular weight $M_{w,total}$ of at least 800 g/mol, preferably at least 1,000 g/mol, more preferably at least 1,400 g/mol, more preferably at least 2,400 g/mol, most preferably at least 3,000 g/mol and optionally polymers A1 have a total weight average molecular weight $M_{w,total}$ of at most 10,000 g/mol, preferably at most 5,000 g/mol.

Weight-average molecular weights are determined by size exclusion chromatography (SEC) as described in the example section ("Measured values and measuring methods"). The weight-average molecular weight $M_w$ refers to the weight-average molecular weight of one single polymer A1 and is determined by size exclusion chromatography (SEC) for each polymer A1 separately.

The total weight-average molecular weight $M_{w,total}$ of the polymers A1 in total may be calculated via equation (1) from the individual weight-average molecular weights $M_{w,j}$ of each polymer $A1_j$ (j=1 to k with k being the number of individual polymers A1 in the totality of polymers A1).

$$M_{w,total} = \frac{\sum_j p_j M_{w,j}^2}{\sum_j p_j M_{w,j}} \qquad (1)$$

The number portion $p_j$ is calculated from the mass portion $m_j$ and the weight-average molecular weight $M_{w,j}$ of each single polymer via equations (2) and (3).

$$p_j = \frac{n_j}{\sum_j n_j} \qquad (2)$$

$$n_j = \frac{m_j}{M_{w,j}} \qquad (3)$$

If for example polymers A1 consist of 20 wt.-% polymer $A1_1$ ($M_{w,1}$=500 g/mol), 30 wt.-% polymer $A1_2$ ($M_{w,2}$=2000 g/mol) and 50 wt.-% polymer $A1_3$ ($M_{w,3}$=5000 g/mol), the total weight-average molecular weight $M_{w,total}$ is 3200 g/mol. If polymer A1 consists of one single polymer A1, e.g. polymer A1$_2$ ($M_{w,2}$=2000 g/mol), then $M_{w,total}$ is identical to the $M_w$ of this single polymer A1.

Polymer(s) A1 may contain less than 15 wt.-% monomers, more preferably less than 10 wt.-% monomers, more preferably less than 8 wt.-% monomers based on the total weight of polymer(s) A1 including its monomers.

Each polymer A1 may contain less than 15 wt.-% monomers, more preferably less than 10 wt.-% monomers, more preferably less than 8 wt.-% monomers based on the weight of said polymer A1 including its monomers.

Optionally polymer(s) A1 have a total weight-average molecular weight $M_{w,total}$ of at least 800 g/mol, preferably at least 1,000 g/mol, more preferably at least 1,400 g/mol, more preferably at least 2,400 g/mol, most preferably at least 3,000 g/mol and optionally polymer(s) A1 have a total weight average molecular weight $M_{w,total}$ of at most 10,000 g/mol, preferably at most 5.000 g/mol and optionally at least one polymer A1, preferably each polymer A1, has a weight-average molecular weight $M_w$ of at least 800 g/mol, preferably at least 1,000 g/mol, more preferably at least 1,400 g/mol, more preferably at least 2,400 g/mol, most preferably at least 3,000 g/mol and optionally at least one polymer A1, preferably each polymer A1, has a weight average molecular weight $M_w$ of at most 10,000 g/mol, preferably at most 5.000 g/mol.

Polymer(s) A1 may comprise or consist of branched polymer(s).

In case component A comprises one polymer A1, this polymer A1 is preferably a branched polymer. In case component A comprises different polymers A1, preferably at least one of the polymers A1, more preferably each polymer A1, is a branched polymer. Optionally at least one polymer A1, more preferably each polymer A1, has a degree of branching (DB) of at least 0.05, preferably from 0.05 to 0.99, preferably from 0.07 to 0.9, and more preferably from 0.1 to 0.5.

The DB is determined by $^1$H-NMR-spectroscopy. The DB is obtained by comparison of the intensity of the signals. The degree of branching is calculated according to the following equation:

DB=(0+T)/(D+L+T), wherein 0, T and L are the fractions of dendritic, terminal or linearly incorporated monomers in the resulting branched polymers obtained from integration of the respective signals in NMR-spectra. For further information reference is further made to H. Frey et al., *Acta Polym*. 2013, 51, 995-1019.

Optionally polymer(s) A1 has (have) a total weight-average molecular weight $M_{w,total}$ of at least 800 g/mol, preferably at least 1,000 g/mol, more preferably at least 1,400 g/mol, more preferably at least 2,400 g/mol, most preferably at least 3,000 g/mol and optionally polymer(s) A1 has (have) a total weight-average molecular weight $M_{w,total}$ of at most 10,000 g/mol, preferably at most 5.000 g/mol, and optionally at least one polymer A1, preferably each polymer A1, has a weight-average molecular weight $M_w$ of at least 800 g/mol, preferably at least 1,000 g/mol, more preferably at least 1,400 g/mol, more preferably at least 2,400 g/mol, most preferably at least 3,000 g/mol and optionally at least one polymer, preferably each polymer A1, has a weight average molecular weight $M_w$ of at most 10,000 g/mol, preferably at most 5.000 g/mol and optionally polymer(s) A1 has(have) a $NC_{ps}$ from 1 to 33 wt.-%, preferably from 3 to 30 wt.-%, preferably from 5 to 25 wt.-%, preferably from 7 to 20 wt.-% and optionally at least one polymer of polymer(s) A1, preferably each polymer A1, has a $NC_{ps}$ from 1 to 33 wt.-%, preferably from 3 to 30 wt.-%, preferably from 5 to 25 wt.-%, preferably from 7 to 20 wt.-% and optionally at least one polymer of polymer(s) A1, preferably each polymer) A1 has a degree of branching of at least 0.05, preferably from 0.05 to 0.99, preferably from 0.07 to 0.9, more preferably from 0.1 to 0.5.

Poly(Amino Acid)(s):

Optionally the polymer(s) A1 comprise(s) at least one or consists of at least one poly(amino acid) which is a polymerization product of amino acids and optionally other monomers selected from the group consisting of
  a) amines comprising at least two amino groups, wherein the amines are no amino acids, and
  b) di and/or tricarboxylic acids, which are no amino acid(s),
wherein at least 70 wt.-%, at least 75 wt.-%, at least 80 wt.-%, preferably at least 85 wt.-%, preferably at least 90 wt.-%, preferably at least 95 wt.-%, preferably at least 97.5 wt.-%, preferably at least 99 wt.-%, preferably 100 wt.-% amino acids, are used as monomers for the polymerization reaction based on total amount of monomers.

Poly(amino acid) may comprise a polymerization product of one or two or more different amino acids. The term "polymer" is used for such polymerization product, even if the polymerization reaction is not run to completion. Poly (amino acid) may consist of dimers (n=2), trimers (n=3), oligomers (n=4-10) and macromolecules (n>10)—wherein n is the number of monomers which have been reacted to form the dimers, trimers, oligomers and macromolecules—and may also include monomers. These monomers may be present due to incomplete conversion of the monomers during the polymerization reaction and/or due to an addition of additional monomers after finishing the polymerization reaction, wherein the additional monomers are selected from the group of the monomers, which have been used for the polymerization reaction. Preferably, no monomers are added after finishing the polymerization reaction. Poly(amino acid) may also include other monomers than amino acids, like e.g. di and/or tricarboxylic acids and/or amines comprising at least two amino groups, wherein the amines and/or the di- and tricarboxylic acids are no amino acids.

According to this invention the term poly(amino acid)s may also include poly(amino acid) derivatives, which may be obtained by modification of the poly(amino acid) after polymer synthesis.

The modification of poly(amino acid)s may be performed by reaction with
  i) alkyl- or alkenylcarboxylic acids, such as for example octanoic acid, nonanoic acid, decanoic acid, dodecanoic acid, hexadecenoic acid, stearic acid, oleic acid, linoleic acid and/or linolenic acid and/or or their Li, Na, K, Cs, Ca or ammonium salts, and/or
  ii) polyalkylene oxides which are terminated by amino groups and/or acid groups and have a functionality of one, two or more, preferably polyethylene oxides, polypropylene oxides and/or polyethylene-propylene oxide, and/or
  iii) alkylene oxides, such as ethylene oxide, propylene oxide and/or butylene oxide and/or
  iv) lactones, e.g. epsilon-caprolactone, delta-valerolactone, gamma-butyrolactone and/or
  v) alcohols, such as alkanole, for example oleyl alcohol.

Amino acid(s) mean organic compounds comprising at least one primary amine (—NH$_2$) and at least one carboxyl (—COOH) functional groups. The amino acid(s) may be lysine, histidine, isoleucine, leucine, methionine, phenylalanine, threonine, tryptophan, valine, arginine, aspartic acid, glutamic acid, serine, asparagine, glutamine, cysteine, selenocysteine, glycine, alpha-alanine, beta-alanine, tyrosine, gamma-amino-butyric acid, epsilon-aminocaproic acid, ornithine, diaminopimelic acid, 2,3-diaminopropionic acid, 2,4-diaminobutyric acid or mixtures thereof. The amino acids can be used in their L- or D- or racemic form. The amino acids may also be used in their cyclic lactam form, e.g. epsilon-caprolactam.

Preferred amino acids which are used for the polymerization reaction are diamino acids comprising two amine groups (—NH$_2$) and at least one carboxyl (—COOH) functional group. Such diamino acids may be ornithine, diaminopimelic acid, 2,3-diaminopropionic acid, 2,4-diaminobutyric acid, and/or lysine, preferably lysine, more preferably L-lysine. Although they are sometimes named as diamino acids, according to this invention asparagine and glutamine are not included in the group of diamino acids, since the second functional group is an amide (CO—NH$_2$) and not an amine (—NH$_2$).

Poly(amino acid)s may be formed by polymerization of amino acids with one amine group and amino acids with two or more amino groups, e.g. diamino carboxylic acids. Polymer(s) A1 may comprise or consist of one or more poly (amino acid)s.

Poly(amino acid)s may contain less than 15 wt.-% amino acid monomers, more preferably less than 10 wt.-% amino acid monomers, more preferably less than 8 wt.-% amino acid monomers based on the total weight of poly(amino acid)s. The weight amount of monomers is calculated based on total weight of poly(amino acid)s including its monomers.

Optionally polymer(s) A1 comprise at least 70 wt.-%, preferably at least 80 wt.-%, preferably at least 90 wt.-%, preferably at least 95 wt.-%, preferably at least 98 wt.-%, preferably at least 99 wt.-%, preferably at least 99.5 wt.-%, most preferably 100 wt.-% poly(amino acid)s, based on the total weight of the polymer(s) A1.

Optionally poly(amino acid)(s) of polymer(s) A1 has (have) a weight-average molecular weight in the range from 800 g/mol to 10,000 g/mol, preferably 1,000 g/mol to 7,500 g/mol, preferably 1,150 g/mol to 5,000 g/mol, more preferably 1,300 g/mol to 5,000 g/mol, more preferably 1,300 g/mol to 5,000 g/mol, more preferably 2,400 to 5,000 g/mol, most preferably 3,000 to 5,000 g/mol. and optionally at least one poly(amino acid) of polymer(s) A1, preferably each poly(amino acid) of polymer(s) A1 has a degree of branching (DB) of from 0.2 to 0.7, preferably from 0.25 to 0.60, preferably from 0.30 to 0.50 and optionally the polymer(s) A1 comprise preferably at least 60 wt.-%, preferably at least 70 wt.-%, preferably at least 75 wt.-%, preferably at least 80 wt.-%, preferably at least 85 wt.-%, preferably at least 90 wt.-%, preferably at least 95 wt.-%, preferably at least 98 wt.-%, preferably at least 99 wt.-%, preferably at least 99.5 wt.-%, most preferably 100 wt.-% poly(amino acid)s, based on the total weight of the polymer(s) A1.

Polylysine(s):

Preferably, polymer(s) A1 comprise(s) at least one polylysine or consist(s) of one or more polylysine(s), which is (are) a polymerization product of monomer lysine, preferably L-lysine, and optionally other monomers selected from the group consisting of
  a) amino acids, preferably comprising at least two amino groups,
  b) amines comprising at least two amino groups, wherein the amines are no amino acids, and
  c) di and/or tricarboxylic acids, which are no amino acids, wherein at least 70 wt.-%, preferably at least 75 wt.-%, preferably at least 80 wt.-%, preferably at least 85 wt.-%, preferably at least 90 wt.-%, preferably at least 95 wt.-%, preferably at least 97.5 wt.-%, preferably at least 99 wt.-%, preferably 100 wt.-% lysine, is used as monomer for the polymerization reaction based on total amount of monomers.

Polylysine comprise or consist of dimers (n=2), trimers (n=3), oligomers (n=4-10) and macromolecules (n>10)—wherein n is the number of monomers which have been reacted to form the dimers, trimers, oligomers and macromolecules—and monomers. These monomers can be present either due to incomplete conversion of the monomers during the polymerization reaction or due to an addition of additional monomers after finishing the polymerization reaction, wherein the additional monomers are selected from the group of the monomers, which have been used for the polymerization reaction. Preferably, no monomers are added after finishing the polymerization reaction.

Optionally polymer(s) A1 comprise(s) or consist(s) of one or more polylysine(s), more preferably poly-L-lysine(s). Preferably, the polymer(s) A1 comprise(s) at least 60 wt.-%, preferably at least 70 wt.-%, preferably at least 80 wt.-%, preferably at least 90 wt.-%, preferably at least 95 wt.-%, preferably at least 98 wt.-%, preferably at least 99 wt.-%, preferably at least 99.5 wt.-%, most preferably 100 wt.-% polylysine(s), based on the total weight of the polymer(s) A1. For the sake of clarity polylysines means different polylysines, e.g. with different weight-average molecular weight and/or different degree of branching.

Optionally polymer(s) A1 comprise(s) polylysine(s) or consist(s) of polylysine(s), wherein polylysine(s) has (have) a total weight-average molecular weight $M_{w,total}$ in the range from 800 g/mol to 10,000 g/mol, preferably 1,000 g/mol to 7,500 g/mol, preferably 1,150 g/mol to 5,000 g/mol, more preferably 1,300 g/mol to 5,000 g/mol, more preferably 2,400 to 5,000 g/mol, most preferably 3,000 to 5,000 g/mol.

Preferably, polymer(s) A1 comprise(s) polylysine(s) or consist(s) of polylysine(s), wherein polylysines(s) has (have) a total weight-average molecular weight $M_{w,total}$ in the range from 800 g/mol to 10,000 g/mol, preferably 1,000 g/mol to 7,500 g/mol, more preferably 1,150 g/mol to 5,000 g/mol, more preferably 1,300 g/mol to 5,000 g/mol, more preferably 2,400 to 5,000 g/mol, most preferably 3,000 to 5,000 g/mol and optionally at least one polylysine of polymer(s) A1, preferably each polylysine of polymer(s) A1, has (have) a weight-average molecular weight in the range from 800 g/mol to 10,000 g/mol, preferably 1,000 g/mol to 7,500 g/mol, preferably 1,150 g/mol to 5,000 g/mol, more preferably 1,300 g/mol to 5,000 g/mol, more preferably 2,400 to 5,000 g/mol, most preferably 3,000 to 5,000 g/mol.

Lysine has two possibilities to react during polymerization. Either the α-NH$_2$ or the ε—NH$_2$ can react with the carboxylic acid. Therefore, two linear polylysine types exist, i.e. α-polylysine or the ε-polylysine. Polymerisation can also performed in a manner, that both α-NH$_2$ and the ε—NH$_2$ react with the carboxylic acid group to form both ε-linkages and α-linkages. Preferably, the polylysine is a branched polylysine. Preferred polylysine(s) as used according to the present invention have more ε-linkages than α-linkages. Preferably, the ratio of ε-linkages to α-linkages is between 1.0:1 and 6.0:1, preferably between 1.25:1 and 4.0:1, preferably between 1.5:1 and 3.0:1. This ratio can be determined by integration of the corresponding signals in the $^1$H-NMR spectra of the polylysines.

Polylysine(s) may contain less than 15 wt.-% lysine monomers, more preferably less than 10 wt.-% lysine monomers, more preferably less than 8 wt.-% lysine monomers based on the total weight of Polylysine(s).

Each polylysine may contain less than 15 wt.-% lysine monomers, more preferably less than 10 wt.-% lysine monomers, more preferably less than 8 wt.-% lysine monomers based on the total weight of said polylysine.

The branched polylysine may, for example, have a degree of branching (DB) from 0.2 to 0.7, preferably from 0.25 to 0.60, preferably from 0.30 to 0.50.

In case component A comprises one polylysine, the $NC_{ps}$ of the polylysine may be from 5 to 12.5 wt.-%, more preferably from 7.5 to 12.5 wt. %, more preferably from 8.5 to 12 wt.-%, most preferably from 9 to 11.5 wt.-%.

In case component A comprise two or more polylysines, the $NC_{ps}$ of polylysines in total may be from 5 to 12.5 wt.-%, more preferably from 7.5 to 12.5 wt. %, more preferably from 8.5 to 12 wt.-%, most preferably from 9 to 11.5 wt.-%, and optionally the $NC_{ps}$ of at least one polylysine, preferably of each polylysine, may be from 5 to 12.5 wt.-%, more preferably from 7.5 to 12.5 wt. %, more preferably from 8.5 to 12 wt.-%, most preferably from 9 to 11.5 wt.-%.

Optionally polymer(s) A1 comprise(s) or consist(s) of polylysine(s), wherein polylysine(s) has (have) a total weight-average molecular weight $M_{w,total}$ in the range from 800 g/mol to 10,000 g/mol, preferably 1,000 g/mol to 7,500 g/mol, preferably, 1,150 g/mol to 5,000 g/mol, more preferably 1,300 g/mol to 5,000 g/mol, more preferably 2,400 to 5,000, most preferably 3,000 to 5,000 g/mol and optionally at least one polylysine, preferably each polylysine, has a weight-average molecular weight in the range from 800 g/mol to 10,000 g/mol, preferably 1,000 g/mol to 7,500 g/mol, preferably 1,150 g/mol to 5,000 g/mol, more preferably 1,300 g/mol to 5,000 g/mol, more preferably 2,400 to 5,000 g/mol, most preferably 3,000 to 5,000 g/mol and optionally at least one polylysine, preferably each polylysine, has a degree of branching (DB) of between 0.2 and 0.7, preferably 0.25 and 0.60, preferably between 0.30 and 0.50 and optionally the polylysine(s) has (have) $NC_{ps}$ from 5 to 12.5 wt.-%, more preferably 7.5 to 12.5 wt. %, more preferably from 8.5 to 12 wt.-%, most preferably from 9 to 11.5 wt.-% and optionally at least one polylysine, preferably each polylysine, has a $NC_{ps}$ from 5 to 12.5 wt.-%, more preferably 7.5 to 12.5 wt. %, more preferably from 8.5 to 12 wt.-%, most preferably from 9 to 11.5 wt.-%.

The production of polylysine is generally known and may be performed as e.g. described in WO2016062578, preferably in claim 1, most preferably in any Examples 4 to 10. Another method for producing polylysine from lysine salts is described in WO2007060119.

According to this invention the term polylysine(s) also include polylysine derivatives, which may be obtained by modification of the polylysine after polymer synthesis.

The modification of polylysine may be performed by reaction with
i) alkyl- or alkenylcarboxylic acids, such as for example octanoic acid, nonanoic acid, decanoic acid, dodecanoic acid, hexadecenoic acid, stearic acid, oleic acid, linoleic acid and/or linolenic acid and/or their Li, Na, K, Cs, Ca or ammonium salts, and/or
ii) polyalkylene oxides which are terminated by amino groups and/or acid groups and have a functionality of one, two or more, preferably polyethylene oxides, polypropylene oxides and/or polyethylene-propylene oxide, and/or
iii) alkylene oxides, such as ethylene oxide, propylene oxide and/or butylene oxide and/or
iv) lactones, e.g. epsilon-caprolactone, delta-valerolactone, gamma-butyrolactone and/or
v) alcohols, such as alkanole, for example oleyl alcohol.

Amines comprising at least two amino groups:

Optionally amines comprising two amino groups, which are suitable for use as monomers in the polymerization to polymer A1, are selected from the group consisting of 1,2-ethylenediamine, 1,2-propylenediamine, 1,3-proplylenediamine, butylenediamine (for example 1,2- or 1,4-butylenediamine), diaminopentane (for example 1,2- and/or or 1,5 diaminopentane), diaminohexane (for example 1,2- and/or 1,6-diaminohexane), diaminoheptane (for example 1,2- and/or 1,7-diaminoheptane), diaminooctane (for example 1,2- and/or 1,8-diaminooctane), diaminonane (for example 1,2- and/or 1,9-diaminononane), diaminodecane (for example 1,2- and/or 1,10-diaminodecane), diaminoundecane (for example 1,2- and/or 1,11-diaminoundecane), diaminododecane (for example 1,2- and/or 1,12-diaminododecane, cyclohexylenedia-mine, bis-(3-aminopropyl)amine, bis-(2-aminoethyl)amine, N-(2-aminoethyl)-1,3-propylenediamine, bis-N-(2-aminoethyl)-1,3-propylenediamine, N,N'-bis-(3-aminopropyl)-1,2-ethylenediamine, N,N'-bis-(3-ami-nopropyl)-1,4-butylenediamine N,N-bis-(3-aminopropyl)-1,2-ethylenediamine, tris-(aminopropyl)amine, tris-(aminoethyl)amine, amine-terminated polyoxyalkylene polyols (so-called jeffamines), amine-terminated polytetramethylene glycols and mixtures thereof.

Preferred amines comprising two amino groups are selected from the group consisting of: 1,2-ethylenediamine, 1,3-propylenediamine, bis-(3-aminopropyl)amine, N-(2-aminoethyl)-1,3-propylenediamine, bis-(2-aminoethyl)amine, bis-N-(2-aminoethyl)-1,3-propylenediamine, N,N'-bis-(3-aminopropyl)-1,2-ethylenediamine, N,N-bis-(3-aminopropyl)-1,2-ethylenediamine and mixtures thereof. Most preferred are 1,2-ethylenediamine, 1,3-propylenediamine, N-(2-aminoethyl)-1,3-propylenediamine, N,N'-Bis-(3-aminopropyl)-1,2-ethylenediamine and mixtures thereof.

Di- and tricarboxylic acid(s):

Suitable dicarboxylic acids for use as monomers in the polymerization to polymer A1 are oxalic acid, ma-Ionic acid, succinic acid, glutaric acid, adipic acid, pimelic acid, suberic acid, azelaic acid, sebacic acid, undecane-1,11-dicarboxylic acid, dodecane-1,12-dicarboxylic acid, maleic acid, fumaric acid, malic acid, cis- and/or trans-cyclohexane-1,2-dicarboxylic acid, cis- and/or trans-cyclohexane-1,3-dicarboxylic acid, cis- and/or trans-cyclohexane-1,4-dicarboxylic acid, cis- and/or trans-cyclopentane-1,2-dicarboxylic acid, cis- and trans-cyclopentane-1,3-dicarboxylic acid or mixtures thereof, preferably malonic acid, succinic acid, glutaric acid and/or adipic acid.

Suitable tricarboxylic acids or tetracarboxylic acids for use as monomers in the polymerization to polymer A1 are trimesic acid, trimellitic acid, pyromellitic acid, butanetricarboxylic acid, naphthalene tricarboxylic acid and cyclohexane-1,3,5-tricarboxylic acid, citric acid or mixtures thereof, preferably citric acid. Preferred are dicarboxylic acids.

Further Components A2 and A3:

Component A comprises polymer(s) A1 and optionally comprises component A2 and comprises optionally component A3 which is water. Preferably, Component A comprises polymer(s) A1 and comprises component A3 which is water and optionally comprises further component A2. Polymer(s) A1 and component A2 do not comprise water. Component A3 which is water may be used to dissolve or disperse polymer(s) A1 and/or component A2.

Component A2 may comprise or consist of one or more substances selected from the group consisting of polyols, urea, urea derivatives like ethylene urea, 1,3-dimethylurea, co-solvents, rheology modifiers, and other auxiliaries like biocides, dyes, pigments, flame retardants, and mixtures thereof.

Polyols may be selected from the group consisting of ethylene glycol, diethylene glycol, propylene glycol, dipropylene glycol, butanediol, glycerine, trimethylolpropane, triethanolamine, pentaerythritol, sorbitol, and mixtures thereof. Other suitable polyols are biopolyols, such as polyols derived from soya oil, rapeseed oil, castor oil, sunflower oil or mixtures thereof. Other suitable polyols are polyether polyols which can be obtained via polymerization of cyclic oxides, for example ethylene oxide, propylene oxide, butylene oxide, or tetrahydrofuran in the presence of polyfunctional initiators or mixtures thereof.

Co-solvents may be selected from alcohols, like ethanol, and/or carbonates, like diethyl carbonate.

Rheology modifiers may be selected from the group of polymeric thickeners, e.g. carboxy-methylcellulose and/or polyvinylalcohol.

Component A may comprise
20 to 80 wt.-%, preferably 30 to 70 wt.-%, preferably 40 to 65 wt.-% polymer(s) A1, and optionally 0 to 30 wt.-%, preferably 0 to 20 wt.-%, preferably 0 to 10 wt.-%, preferably 0 to 5 wt.-% component A2, and
80 to 20 wt.-%, preferably 30 to 70 wt.- preferably 35 to 60 wt.-% component A3 which is water, based on the weight amount of Component A, wherein the weight amount of all polymer(s) A1, components A2 and A3 is selected such that the total weight of the sum of the polymers (s) A1, components A2 and A3 does not exceed 100 wt.-% or is preferably 100 wt.-%.

Component B

Component B comprises component B1 which is selected from the group consisting of monosaccharides, disaccharides, hydroxyacetone, glycolaldehyde and mixtures thereof, preferably selected from the group consisting of hydroxyacetone, 1,3-dihydroxyacetone, glycolaldehyde, glyceraldehyde, xylose, fructose, glucose, mannose, saccharose and mixtures thereof, most preferably selected from the group consisting of fructose, glucose, saccharose and mixtures thereof and optionally comprises component B2 and optionally component B3 which is water. Preferably, Component B comprises component B1 and comprises component B3 which is water and optionally comprises component B2. Component B1 and component B2 do not comprise water. Component B3 which is water may be used to dissolve or disperse component B1 and/or component B2.

Component B may comprise 20 to 80 wt.-%, preferably 30 to 75 wt.-%, preferably 40 to 70 wt.-% of component B1 based on the total weight of component B.

Mixtures of 1,3-dihydroxyacetone, glycolaldehyde and glyceraldehyde may be prepared by a triazolium salts catalyzed condensation reaction of formaldehyde (EP0786456A2).

1,3-dihydroxyacetone may be prepared by thiazolium ylide-catalyzed condensation of formaldehyde (EP0568872A1). Glycolaldehyde and Glyceraldehyde may be prepared from paraformaldehyde in ethylacetate in the presence of molecular sieves and nitrone (EP3080178A1).

Component B2 may comprise or consist of one or more substances selected from the group consisting of polyols, urea, urea derivatives like ethylene urea, 1,3-dimethylurea, organic acids, co-solvents, rheology modifiers, and/or other auxiliaries like biocides, dyes, pigments, flame retardants, and mixtures thereof. The organic acids may be e.g. lactic acid and/or formic acid. Preferably, component B2 does not comprise any monosacharide and/or disaccharide and/or hydroxyacetone and/or glycolaldehyde.

Polyols may be selected from the group consisting of ethylene glycol, diethylene glycol, propylene glycol, dipropylene glycol, butanediol, glycerine, trimethylolpropane, triethanolamine, pentaerythritol, sorbitol, and mixtures thereof. Other suitable polyols may be biopolyols, such as polyols derived from soya oil, rapeseed oil, castor oil, sunflower oil or mixtures thereof. Other suitable polyols may be polyether polyols which can be obtained via polymerization of cyclic oxides, for example ethylene oxide, propylene oxide, butylene oxide, or tetrahydrofuran in the presence of polyfunctional initiators or mixtures thereof.

Co-solvents may be selected from alcohols, like ethanol, and/or carbonates, like diethyl carbonate.

Rheology modifiers may be selected from the group of polymeric thickeners, e.g. carboxymethyl-cellulose.

Component B may comprise
20 to 80 wt.-%, preferably 30 to 75 wt.-%, preferably 40 to 70 wt.-% component B1, optionally 0 to 30 wt.-%, preferably 0 to 20 wt.-%, preferably 0 to 10 wt.-%, preferably 0 to 5 wt.-% component B2, and
20 to 80 wt.-%, preferably 25 to 70 wt.-%, preferably 30 to 60 wt.-% component B3 which is water, based on the total weight of component B, wherein the weight amounts of components B1, B2 and B3 are selected such that the total weight of the sum of components B1, B2 and B3 does not exceed 100 wt.-%
or is preferably 100 wt.-%, wherein optionally
component B1 is a mixture comprising or consisting of
30 to 70 wt.-% glucose, preferably 40 to 60 wt.-% glucose,
30 to 70 wt.-% fructose, preferably 40 to 60 wt.-% fructose,
and 0 to 40 wt.-% sucrose, preferably 0 to 20 wt.-% sucrose,
based on the total weight of component B1, wherein the weight amounts of glucose, fructose and sucrose are selected such that the total weight of the sum of glucose, fructose and sucrose does not exceed 100 wt. % or is 100 wt.-% or
component B1 is a mixture comprising or consisting of
0 to 30 wt.-% glucose, preferably 0 to 10 wt.-% glucose,
0 to 30 wt.-% fructose, preferably 0 to 10 wt.-% fructose and
70 to 100 wt.-% sucrose, preferably 90 to 100 wt-% sucrose,
based on the total weight of component B1, wherein the weight amounts of glucose and fructose and sucrose are selected such that the total weight of the sum of glucose, fructose and sucrose does not exceed 100 wt. % or is 100 wt.-%.

The binder composition according to the present invention may comprise
preferably 60 to 85 wt.-% preferably 70 to 85 wt.-%, preferably 60 wt.-% to 100 wt.-%, 70 wt.-% to 100 wt.-%, preferably 80 wt.-% to 100 wt.-%, preferably 90 wt.-% to 100 wt.-%, preferably 95 wt.-% to 100 wt.-%, preferably 99 wt.-% to 100 wt.-% polymer(s) A1, based on the total weight of the sum of polymer(s) A1 and component B1. The amount of component B1 may be also 0 wt.-%.

Optionally the binder composition according to the present invention comprises
  60 to 85 wt.-%, 70 to 85 wt.-%, preferably 60 wt.-% to 100 wt.-%, preferably 70 wt.-% to 100 wt.-%, preferably 80 wt.-% to 100 wt.-%, preferably 90 wt.-% to 100 wt.-%, preferably 95 wt.-% to 100 wt.-%, preferably 99 to 100 wt.-%, polymer(s) A1, and
  preferably 15 to 40 wt.-%, preferably 15 to 30 wt.-%, preferably 0 to 40 preferably 0 to 30 wt.-%, preferably 0 to 20 wt.-%, preferably 0 to 10 wt.-%, preferably 0 to 5 wt.-%, preferably 0 to 1 wt.-% component B1, based on the total weight of the sum of polymer(s) A1 and component B1, wherein the weight amounts of the polymer(s) A1 and component B1 are selected such that the total weight of the sum of polymer(s) A1 and component B1 is 100 wt.-%.

Component A may comprise
  20 to 80 wt.-%, preferably 30 to 70 wt.-%, preferably 40 to 65 wt.-% polymer(s) A1, optionally 0 to 30 wt.-%, preferably 0 to 20 wt.-%, preferably 0 to 10 wt.-%, preferably 0 to 5 wt.-% component A2,
  80 to 20 wt.-%, preferably 30 to 70 wt.-% preferably 35 to 60 wt.-% component A3, which is water based on the total weight of the sum of polymer(s) A1, components A2 and A3, wherein the weight amounts of polymer(s) A1, components A2 and A3 are selected such that the total weight of the sum of polymer(s) A1 and components A2 and A3 is 100 wt.-% and component B may comprise
  20 to 80 wt.-%, preferably 30 to 75 wt.-%, preferably 40 to 70 wt.-% component B1, optionally 0 to 30 wt.-%, preferably 0 to 20 wt.-%, preferably 0 to 10 wt.-%, preferably 0 to 5 wt.-% component B2, and
  from 20 to 80 wt.-%, preferably 25 to 70 wt.-%, preferably 30 to 60 wt.-% component B3 which is water, based on the total weight of the sum of components B1, B2 and B3, wherein the weight amounts of components B1, B2 and B3 are selected such that the total weight of the sum of components B1, B2 and B3 is 100 wt.-%.

Optionally the binder composition according to the present invention comprises
  a) component A comprising polymer(s) A1 wherein polymer(s) A1 comprises at least 70 wt.-% poly-amino acids based on the total weight of the polymer(s) A1 and
  b) component B comprising component B1 which is selected from the group consisting of monosaccharides, disaccharides, hydroxyacetone, glycolaldehyde and mixtures thereof and optionally component C comprising functional additives,
  wherein the polymer(s) A1 has(have) a total weight average molecular weight $M_w$, total of at least 800 g/mol to 10.000 g/mol
  wherein the binder composition comprises
  60 to 100 wt.-% polymer(s) A1, and 0 to 40 wt.-% component B1,
  preferably 70 to 100 wt.-% polymer(s) A1, and 0 to 30 wt.-% component B1,
  preferably 80 to 100 wt.-% polymer(s) A1, and 0 to 20 wt.-% component B1,
  preferably 90 to 100 wt.-% polymer(s) A1, and 0 to 10 wt.-% component B1,
  preferably 95 to 100 wt.-% polymer(s) A1, and 0 to 5 wt.-% component B1,
  preferably 99 to 100 wt.-% polymer(s) A1, and 0 to 1 wt.-% component B1,
  based on the total weight of the sum of polymer(s) A1 and component B1, wherein the weight amounts of the polymer(s) A1 and component B1 are selected such that the total weight of the sum of polymer(s) A1 and component B1 is 100 wt.-%.

Functional additives are additives for the improvement of certain properties of the lignocellulose-based composite article, e.g. the water resistance and/or the resistance against microorganisms.

Component C may comprise or consist of:
  Component C1 which is(are) (a) functional additive(s) and component C2 which is water
  Component C2 which is water may be used to dissolve or disperse component C1.

The functional additive C1 may be selected from the group of hydrophobizing agents, such as paraffin, rheology modifiers, fillers, fungicides, biocides, flame retardants, pigments, dyes, or mixtures thereof.

One preferred component C is paraffin emulsion, in which paraffin (component C1) is emulsified in water (component C2). Optionally the binder composition comprises 0 to 50 wt.-%, preferably 0 to 25 wt.-%, preferably 0 to 15 wt.-%, preferably 0 to 10 wt.-%, component C1 based on the total weight of the sum of polymer(s) A1 and component B1 and component C1.

The binder composition may comprise
  20 to 80 wt.-%, preferably 30 to 70 wt.-%, preferably 40 to 65 wt.-% polymer(s) A1, optionally 0 to 30 wt.-%, preferably 0 to 20 wt.-%, preferably 0 to 10 wt.-%, preferably 0 to 5 wt.-% component A2,
  80 to 20 wt.-%, preferably 30 to 70 wt.- preferably 35 to 60 wt.-% component A3, which is water, based on the total weight of the sum of polymer(s) A1 and components A2 and A3, wherein the weight amounts of the polymer(s) A1 and components A2 and A3 are selected such that the weight amount of the sum of polymer(s) A1, component(s) A2 and A3 is 100 wt.-% and
  20 to 80 wt.-%, preferably 30 to 75 wt.-%, preferably 40 to 70 wt.-% component B1, optionally 0 to 30 wt.-%, preferably 0 to 20 wt.-%, preferably 0 to 10 wt.-%, preferably 0 to 5 wt.-% component B2, and
  20 to 80 wt.-%, preferably 25 to 70 wt.-%, preferably 30 to 60 wt.-% component B3 which is water, based on the total weight of the sum of components B1, B2 and B3, wherein the weight amounts of components B1, B2 and B3 are selected such that the total weight of the sum of components B1, B2 and B3 is 100 wt.-% and
  0 to 100-%, preferably 10 to 90 wt.-%, preferably 25 to 70 wt.-% component C1,
  0 to 100 wt.-%, preferably 10 to 90 wt.-%, preferably 30 to 75 wt.-% component C2, which is water,
  based on the total weight of the sum of components C1 and C2, wherein the weight amounts of the components C1 and C2 are selected such that the total weight of the sum of components C1 and C2 is 100 wt.-% and
  optionally the binder composition according to the present invention comprises
  60 to 100 wt.-%, preferably 60 to 95 wt.-%, preferably 60 to 85 wt.-% polymer(s) A1, preferably 70 to 85 wt.-%, preferably 70 to 100 wt.-% and 0 to 40 wt.-%, 5 to 40 wt.-%, preferably 15 to 40 wt.-%, preferably 15 to 30 wt.-%, preferably 0 to 30 wt.-% component B1, and preferably 0 to 10 wt.-%, preferably 0 to 5 wt.-% component C1 based on the total weight of the sum of polymer(s) A1 and component B1 and component C1, wherein the weight amount of polymer(s) A1 and component B1 and component C1 is selected such that the total weight of the sum of polymer(s) A1 and component B1 and component C1 is 100 wt.-%.

Optionally the binder composition according to the present invention comprises 60 to 100 wt.-%, preferably 60 to 95 wt.-%, preferably 60 to 85 wt.-% polymer(s) A1, preferably 70 to 85 wt.-%, preferably 70 to 100 wt.-% and 0 to 40 wt.-%, 5 to 40 wt.-%, preferably 15 to 40 wt.-%, preferably 15 to 30 wt.-%, preferably 0 to 30 wt.-% component B1, and preferably 0 to 10 wt.-%, preferably 0 to 5 wt.-% component C1 based on the total weight of the sum of polymer(s) A1 and component B1 and component C1, wherein the weight amount of polymer(s) A1 and component B1 and component C1 is selected such that the total weight of the sum of polymer(s) A1 and component B1 and component C1 is 100 wt.-%.

The present invention also relates to a composition kit comprising the above defined binder composition, wherein component A and component B and optionally component C are stored separately. The binder kit comprises two separate components A and B, which are mixed either before or during or after application to a plurality of lignocellulosic fibers. Optionally the composition Kit may comprise no component B.

The present invention also relates to a reacted binder composition obtainable or obtained by reacting the component A and component B.

The present invention also relates to a reacted binder composition obtainable or obtained by reacting the component A with components of the lignocellulosic fibers and optionally with component B.

The present invention also relates to a reacted binder composition obtainable or obtained by reacting the binder composition according to the present invention.

The binder composition according to the present invention may be used as binder or adhesive for different wood fiber materials.

A further aspect of the present invention relates to a lignocellulose-based composite article comprising:

a plurality of lignocellulosic fibers, and the binder composition or the reacted binder composition as defined above.

The reacted binder composition preferably means a binder composition cured at 20 to 300° C., preferably 40 to 200° C., preferably 50 to 180° C., more preferably 70 to 150° C. and optionally at a pressure of 0.1 to 100 bar, preferably 1 to 100 bar, preferably 1 to 50 bar, preferably 1 to 25 bar. Preferably the curing reaction is a crosslinking reaction (preferably crosslinking of the polymer(s) A1 by reaction with component B1 and/or lignocellulosic fibers, wherein the temperature is the maximum temperature reached in the binder composition during the curing step, preferably at the center of the pressed mats.

A further aspect of the present invention relates to a method for the batchwise or continuous production of lignocellulose-based composite articles, in particular single-layered lignocellulose-based boards or multi-layered lignocellulose-based boards with a core and with at least one upper and one lower surface layer, comprising the following steps:

a) mixing of the lignocellulosic particles with a binder composition for each layer, wherein the mixture for at least one layer comprises the binder composition according to the present invention, b) layer-by-layer scattering of the mixtures for the individual layers to form a mat, c') pressing the mat to a board at a temperature of 80 to 200° C., preferably 80 to 180° C., more preferably 90 to 150° C. and most preferably 100 to 150° C. and at a pressure of 0.1 to 100 bar, preferably 0.1 to 50 bar, preferably 0.1 to 25 bar, wherein a high-frequency electrical field is applied during pressing and wherein the lignocellulosic particles are preferably chips or fibers.

The temperature given for step c') refers to the temperature in the center of the pressed mat at the end of step c'). The boards can be cooled down in a star cooler or more slowly by hot stacking.

The measurement of the temperature in the center of the pressed mat may be carried out according to known methods, in particular according to Meyer/Thoemen, Holz als Roh-und Werkstoff [European Journal of Wood and Wood Products] (2007) 65, page 49 to 55 or Thoemen, 2010, "Vom Holz zum Werkstoff—grundlegende Untersuchungen zur Herstellung und Struktur von Holzwerkstoffen [From wood to materials—basic investigations for the preparation and the structure of wood-based materials]", ISBN 978-3-9523198-9-5, page 24 to 30 and page 78 to 85. For the wireless measurement of the temperature sensors such as the CONTI LOG—or EASYlog-sensors of the Fagus-Grecon Greten GmbH& Co. KG can be used, which can be inserted in the mat during the scattering of the mat.

Said reacted binder composition may still comprise unreacted polymer(s) A1, optionally unreacted component A2, optionally unreacted component B1, optionally unreacted component B2 and/or optionally unreacted components C1.

Optionally said reacted binder composition comprises less than 15 wt.-%, preferably less than 10 wt.-%, more preferably less than 8 wt.-% unreacted polymer(s) A1, unreacted component B1, unreacted component A2 and unreacted component B2 in total based on the total weight of the sum of polymer(s) A1, component A2, component B1 and component B2 before reacting the binder composition.

Lignocellulosic fibers and composite articles therefrom Lignocellulosic fibers as used according to the present invention may be produced by grinding of lignocellulose-containing materials. Before grinding the lignocellulosic material may be cut or crashed into lignocellulosic pieces like chips. The production of lignocellulosic fibers can be carried out by methods known in the art (cf. for example M. Dunky, P. Niemz, Holzwerkstoffe and Leime [Wood Materials and Glues], pp. 135 to 152, Springer Verlag Heidelberg, 2002). Suitable lignocellulosic materials may be ordinarily lignocellulose-containing plants and/or plant parts, in particular wood. Examples of suitable plants include trees, grasses, flax, hemp or mixtures thereof, preferably trees. Preferably lignocellulosic pieces are made from wood. Any desired type of coniferous wood and/or hardwood may be suitable for the production of the wood fibers, such as industrial wood residues, forest timber and/or plantation timber, preferably eucalyptus, spruce, beech, pine, larch, linden, poplar, ash, oak, fir or mixtures thereof, more preferably eucalyptus, spruce, pine, beech or mixtures thereof.

However, other plants comprising lignin, agricultural and/or forestry raw materials and/or residues comprising lignin, such as e.g. straw, flax straw, and/or cotton stalks, can also be used for preparation of lignocellulosic fibers. Palms and/or grasses with lignified stems, such as bamboo, are also suitable for preparation of lignocellulosic fibers. A further source of lignocellulose-containing material for the preparation of lignocellulosic fibers may be waste wood, such as old furniture. One or a plurality of lignocellulosic materials can be used for the production of lignocellulosic fibers.

There are no restrictions on the average density of the lignocellulosic materials from which the lignocellulosic fibers are produced, and this density may be 0.2 to 0.9 g/cm$^3$, preferably 0.4 to 0.85 g/cm$^3$, particularly preferably 0.4 to 0.75 g/cm$^3$, in particular 0.4 to 0.6 g/cm$^3$. Here, density refers to the bulk density in a standard atmosphere (20° C./65% humidity) as defined in DIN 1306, i.e. taking into consideration the hollow space contained in the lignocellulose-containing starting material, e.g. the tree trunk.

The lignocellulosic fibers used can comprise foreign matter that does not originate from lignocellulose-containing plants. The content of foreign matter can vary over a broad range, and is ordinarily 0 to 30 wt.-%, preferably 0 to 10 wt.-%, particularly preferably 0 to 5 wt.-%, in particular 0 to 1 wt.-%, based on the oven dry weight of the lignocellulosic fibers. Foreign matter can be plastics, adhesives, coatings and/or dyes, etc. contained for example in waste wood.

The oven-dry weight of the lignocellulosic fibers is the weight of the lignocellulosic fibers minus the water present therein and can be determined according to EN 322:1993 by placing the pieces in a drying oven at a temperature of (103±2) ° C. until constant mass has been reached.

Lignocellulose-based fiber boards (e.g. medium density fiber board) are listed in M. Dunky, P. Niemz, Holzwerkstoffe and Leime [Wood Materials and Glues], page 7, Springer Verlag Heidelberg, 2002.

The lignocellulosic fibers can be dried according to common drying methods known to the person skilled in the art, resulting in the common low residual water content (within a common range of variability; so-called "residual moisture content"). Common drying methods are listed in M. Dunky, P. Niemz, Holzwerkstoffe and Leime [Wood Materials and Glues], page 111 to 118 and page 143 Springer Verlag Heidelberg, 2002. *The moisture content of the fibers can be measured according to EN* 322:1993 by placing the fibers in a drying oven at a temperature of (103±2°) C until constant mass has been reached. Fibers may be dried to a moisture content of 1 to 8%, preferably 1 to 6%, before adding the binder composition.

The lignocellulosic fibers can also be dried after application of the binder system to the wet fibers, when the binder application is carried out by blowline-blending, which is the preferred method of binder application (M. Dunky, P. Niemz, Holzwerkstoffe and Leime [Wood Materials and Glues], page 145 to 150).

According to this invention the lignocellulose-based composite articles made from lignocellulosic fibers may be medium density fiber board (MDF), high density fiberboard (HDF) and/or wood fiber insulation board (WFI). The production methods for these composites and the use of these composites are known to the person skilled in the art and are described for example in M. Dunky, P. Niemz, Holzwerkstoffe and Leime [Wood Materials and Glues], Part 1, Chapters 4 and 5, Springer Verlag Heidelberg, 2002. Preferably the lignocellulose-based composite article is MDF or HDF, more preferably HDF.

Fibers may be wood fibers, hemp fibers, bamboo fibers, miscanthus fibers, bagasse fibers (sugar cane) or mixtures thereof, preferably wood fibers. The length of the fibers may be 0.01 to 20 mm, preferably 0.05 to 15 mm, particularly preferably 0.1 to 10 mm.

The total thickness of the lignocellulose-based fiber boards made from lignocellulosic fibers according to the present invention varies with the field of use. Lignocellulose-based composite articles made from fibers are preferably in the range from 0.5 to 100 mm, preferably in the range 1.5 to 40 mm, preferably in the range from 10 to 40 mm, preferably 15 to 20 mm, preferably 1.5 to 5 mm, especially 2.0 to 4.0 mm.

The lignocellulose-based fiber boards made from lignocellulosic fibers according to the present invention may comprise one or several layers. Single-layered or multi-layered composite articles such as for example single-layered or three-layered fiber board are commonly known (M. Dunky, P. Niemz, Holzwerkstoffe and Leime [Wood Materials and Glues], page 18 to 22., Springer Verlag Heidelberg, 2002).

The lignocellulose-based fiber board may be a single layer or a multi-layer, preferably a three-layered fiber board. Optionally the lignocellulose-based fiber board consists of a core layer and two surface layers. The lignocellulose-based fiber board comprises the reacted binder composition according to the present invention in at least one layer. The lignocellulose-based fiber board may comprise the reacted binder composition according to the present invention in more than one layer, wherein binder compositions according to the present invention, which are used in the different layers may be the same or different for the different layers. Preferably, the surface layers comprise the reacted binder composition according to the present invention. The core layer may comprise a reacted binder composition according to the present invention or a reacted binder composition selected from the group consisting of phenol-formaldehyde resins, amino resins, a binder based on organic isocyanate or mixtures thereof, preferably a reacted binder composition according to the present invention.

Preferably lignocellulosic fiber board according to the present invention has an internal bond strength of more than 0.8 N/mm$^2$, preferably more than 1.0 N/mm$^2$.

Suitable phenol-formaldehyde resins (also termed PF resins) are known to the person skilled in the art, see by way of example Kunststoff-Handbuch [Plastics Handbook], 2nd edn., Hanser 1988, vol. 10 "Du-roplaste" [Thermosets], pp. 12 to 40.

Suitable amino resin can be any of the amino resins known to the person skilled in the art, preferably those for the production of wood-based composites. These resins, and also production thereof, are described by way of example in Ullmanns Enzyklopädie der technischen Chemie [*Ullmann's Encyclopedia of Industrial Chemistry*], 4th revised and extended edition, *Verlag Chemie*, 1973, pp. 403-424 "Amino-plaste" [Aminoplastics] and *Ullmann's Encyclopedia of Industrial Chemistry*, vol. A2, VCH Verlagsgesellschaft, 1985, pp. 115-141 "Amino Resins" and also in M. Dunky, P. Niemz, Holzwerkstoffe und Leime [Wood-based materials and glues], Springer 2002, pp. 251-259 (UF resins) and pp. 303-313 (MUF and UF with small quantity of melamine). These are generally polycondensates of compounds having at least one carbamide group or amino group, optionally to some extent substituted with organic moieties (another term for the carbamide group being carboxamide group), preferably carbamide group, preferably urea or melamine, and of an aldehyde, preferably formaldehyde. Preferred polycondensates are urea-formaldehyde resins (UF resins), urea-formaldehyde resins (MF resins) and melamine-containing urea-formaldehyde resins (MUF resins), with particular preference urea-formaldehyde resins, for example Kaurit® glue products from BASF SE.

Suitable organic isocyanates are organic isocyanates having at least two isocyanate groups and mixtures of these, in particular any of the organic isocyanates known to the person skilled in the art and mixtures of these, preferably those for the production of wood-based materials or of polyurethanes. These organic isocyanates, and also the production thereof, are described for example in Becker/Braun, Kunststoff Handbuch [Plastics handbook], 3rd revised edition, vol. 7 "Polyurethane" [Polyurethanes], Hanser 1993, pp. 17-21, pp. 76-88 and pp. 665-671.

Preferred organic isocyanates are oligomeric isocyanates having from 2 to 10, preferably from 2 to 8, monomer units and on average at least one isocyanate group per monomer unit, and mixtures of these. The isocyanates can be either aliphatic, cycloaliphatic or aromatic. Particular preference is given to the organic isocyanate MDI (methylenediphenyl diisocyanate) and/or the oligomeric organic isocyanate PMDI (polymeric methylenediphenyl diisocyanate), these being obtainable via condensation of formaldehyde with aniline and phosgenation of the isomers and oligomers produced during the condensation (see by way of example Becker/Braun, Kunststoff Handbuch [Plastics handbook], 3rd revised edition, vol. 7 "Polyurethane" [Polyurethanes], Hanser 1993, p. 18, final paragraph to p. 19, second paragraph and p. 76, fifth paragraph), and mixtures of MDI and/or PMDI. Very particular preference is given to products in the LUPRANATE@ range from BASF SE, in particular LUPRANATE® M 20 FB from BASF SE.

The organic isocyanate may be also an isocyanate-terminated prepolymer which is the reaction product of an isocyanate, e.g. PMDI, with one or more polyols and/or polyamines.

The composite articles of the invention made from fibers may have a mean overall density of 100 to 1000 kg/m$^3$, preferably 400 to 850 kg/m$^3$. The chipboards of the invention may have a mean overall density of 400 to 750 kg/m$^3$, more preferably 425 to 650 kg/m$^3$, especially 450 to 600 kg/m$^3$. The density is determined 24 hours after production according to EN 323:1993.

Optionally 3 to 15 wt.-%, more preferably 3.5 to 12 wt.-%, more preferably 4 to 10 wt.-%, most preferably 4.0 to 8 wt.-%, preferably 3.0 to 6 wt.-%, most preferably 4.5 to 6 wt.-% polymer(s) A1 and component B1 in total based on the total oven-dry weight of the lignocellulosic fibers, are used for the preparation of the lignocellulose-based fiber boards.

Optionally the minimum amount of A1 based on the total oven-dry weight of the lignocellulosic fibers, is 1.5 wt.-%, preferably 2 wt.-%, preferably 2.5 wt. %, preferably 3 wt.-%.

Optionally 3 to 15 wt.-%, preferably 4 to 8 wt.-%, more preferably 4 to 6 wt.-%, polymer(s) A1 and component B1 in total based on the total oven-dry weight of the lignocellulosic fibers, preferably wood fibers, are used for the preparation of fiber boards like medium density fiber board (MDF), high density fiberboard (HDF) or wood fiber insulation board (WFI), preferably HDF.

A further aspect of the present invention relates to a process for the batchwise or continuous production of lignocellulose-based composite articles, in particular multi-layered lignocellulose-based boards, with a core and with at least one upper and one lower surface layer, comprising the following steps.

a) mixing of the lignocellulosic fibers with a binder composition for each layer, wherein the mixture for at least one layer comprises the binder composition according to the present invention,
b) layer-by-layer scattering of the mixtures for the individual layers to form a mat,
c) pressing the mat to a board at a temperature of 80 to 300° C., preferably 120 to 280° C., more preferably 150 to 250° C. and at a pressure of 1 to 100 bar, preferably 1 to 50 bar, preferably 1 to 25 bar.

A further aspect of the present invention relates to a process for the batchwise or continuous production of single layered lignocellulosic fiber boards comprising the following steps:
a) mixing of the lignocellulosic fibers with a binder composition according to the present invention,
b) scattering of the mixture to form a mat,
c) pressing the mat to a board at a temperature of 80 to 300° C. and at a pressure of 1 to 100 bar.

The temperature given for step c) refers to the surface temperature of the heated surface used for pressing, in particular the surface temperature of the press plates.

At the end of the pressing in step c) the temperature in the center of the pressed mat may be at least 80° C., preferably between 80 and 180° C., preferably between 90 and 150° C., more preferably 95 to 125° C. The boards can be cooled down in a star cooler or more slowly by hot stacking.

The measurement of the temperature in the center of the pressed mat may be carried out according to known methods, in particular according to Meyer/Thoemen, Holz als Roh-und Werkstoff [European Journal of Wood and Wood Products] (2007) 65, page 49 to 55 or Thoemen, 2010, "Vom Holz zum Werkstoff—grundlegende Untersuchungen zur Herstellung und Struktur von Holzwerkstoffen [From wood to materials—basic investigations for the preparation and the structure of wood-based materials]", ISBN 978-3-9523198-9-5, page 24 to 30 and page 78 to 85. For the wireless measurement of the temperature sensors such as the CONTI LOG—or EASYlog-sensors of the *Fagus*-Grecon Greten GmbH& Co. KG can be used, which can be inserted in the mat during the scattering of the mat.

The time from the start to the end of pressing in step c) or c') is the press time. The press time factor is the press time divided by the target thickness of the board as described in the example section ("Measured values and measuring methods"). Optionally in the process according to the present invention the press time factor is at most 20 s/mm, preferably at most 14 s/mm, preferably at most 12 s/mm, preferably at most 10 s/mm, preferably at most 8 s/mm and optionally in the process according to the present invention the press time factor is at least 2 s/mm, preferably at least 3 s/mm, preferably at least 4 s/mm, preferably at least 5 s/mm.

Components A and B of the binder composition may be added separately or as a mixture as defined below. Optionally component C may be added as a mixture with components A and/or B or separately.

The corresponding methods for producing lignocellulose-based composites, in particular single-layered lignocellulose-based boards or multi-layered lignocellulose-based boards with at least a core and two surface layers, comprising the steps a), b) and c) are generally known to the person skilled in the art, and are described for example in M. Dunky, P. Niemz, Holzwerkstoffe and Leime [Wood Materials and Glues], Part 1, Chapter 4, Springer Verlag Heidelberg, 2002 or in A. Wagenfuhr, F. Scholz, Taschenbuch der Holztechnik [Handbook of Wood Technology], Chapter 2, Fachbuchverlag Leipzig im Carl Hanser Verlag, 2012 or in H. Thoemen, M. Irle, M. Sernek (ed.), Wood-Based Panels-An Introduction for Specialists, Chapter 1, COST Office, Brunel University Press, London, UB8 3PH, England. The method according to the invention can be carried out discontinuously or continuously, and preferably continuously.

The mixture(s) obtained by step a) comprise(s) water. The water can derive from the residual moisture comprised in the lignocellulosic fibers and from the components A and B and optional C. The water content of these mixture(s) may be adapted using lignocellulosic fibers with an appropriate moisture and/or by increasing the water content in component A, B and/or C and/or by adding additional water to the mixture (which is not part of the components A, B and/or C) during step a), for instance by spraying, and/or by drying the fiber/binder composition obtained after application of the binder to the fibers.

The water content of the mixtures obtained by a) is determined in an analogous manner to the determination of the water content of wood-based panels by EN 322:1993. For this, a sample of the respective mixture (ca. 20 g) is weighed in moist condition ($m_1$) and after drying ($m_0$). The mass $m_0$ is determined by drying at 103° C. to constant mass. Water content is calculated as follows: water content [in wt.-%]=[($m_1-m_0$)/$m_0$]·100.

Water content is calculated as follows: water content [in wt.-%]=[($m_1-m_0$)/$m_0$]·100. In the mixture obtained in step a), the water content of the mixture(s) may be from 3 to 20 wt.-%, preferably from 3.5 to 16 wt.-%, particularly preferably from 4 to 14 wt.-%, very particularly preferably from 5 to 13 wt.-% by weight, based on the total dry weight of the mixture.

Optionally the water content [in wt.-%] in the mixture(s) obtained in step a) for the surface layers is greater than the water content [in wt.-%] in the mixture(s) obtained in step a) for the core layer. In particular, the water content [in wt.-%] in the mixture(s) obtained in step a) for the surface layers is greater than the water content [in wt.-%] in the mixture(s) obtained in step a) for the core layer is 0.5 to 6 wt.-% by weight, very particularly preferably from 2 to 5 wt.-% higher.

Optionally the water content of the mixture obtained in step a) for the core layer is from 3 to 15 wt.-%, more preferably from 3.5 to 12 wt.-%, particularly preferably from 4 to 10 wt.-%, very particularly preferably from 5 to 9 wt.-%, based on the total dry weight of the mixture and the water content of the mixture(s) obtained in step a) for the surface layers is from 5 to 20 wt.-%, preferably from 6 to 16 wt.-%, particularly preferably from 7 to 14 wt.-%, very particularly preferably from 8 to 13 wt.-%, based on the total dry weight of the mixture(s).

After step b) and before step c) or c') the layer(s) may be pre-compressed at a pressure of 0.1 to 30 bar, preferably 0.1 to 25 bar, more preferably 1 to 20 bar, more preferably 1 to 15 bar. The pre-compressing step may take from 1 sec to 120 sec, preferably from 2 to 60 sec, more preferably from 3 to 30 sec. Usually, the pre-compressing step is done without applying heat to the scattered mat. After the pre-compressing step and prior to process step c) or c'), energy can be introduced into the mat in a preheating step with one or more energy sources of any kind. Suitable energy sources are for example hot air, steam or steam/air mixtures. This increases the temperature of the mat and may change the moisture of the mat. After the optional preheating step, the temperature in the core of the mat may be between 40 to 80° C., preferably between 40 and 70° C. The preheating with steam and steam/air mixtures can also be con-ducted in such a way that only the surface-near areas are heated, but the core is not.

Optionally the water content in the lignocellulosic composite obtained in step c) or c') is from 3 to 20 wt.-% by weight, preferably from 5 to 15 wt.-%, more preferably from 7 to 13 wt.-% measured according to EN 322:1993.

From the beginning of scattering until the beginning of precompression, there can for example be an interval of 1 to 120 sec, preferably 2 to 60 sec, particularly preferably 3 to 20 sec. From the beginning of scattering until the beginning of heating and/or pressing, there can for example be an interval of 5 to 300 sec, preferably 7 to 120 sec, particularly preferably 10 to 60 sec.

Precompression and preheating can be carried out by a method known to the person skilled in the art, such as those described in M. Dunky, P. Niemz, Holzwerkstoffe and Leime [Wood Materials and Glues], Springer Verlag Heidelberg, 2002, pg. 122 and 819 or in H.-J. Deppe, K. Ernst, MDF-Medium-Density Fiberboard, DRW-Verlag, 1996, pp. 44, 45 and 93 or in A. Wagenfuhr, F. Scholz, Taschenbuch der Holztechnik [Handbook of Wood Technology], Fachbuchverlag Leipzig, 2012, pg. 219.

In step c) or c'), the thickness of the mat is (further) reduced. In addition, the temperature of the mat is increased by inputting energy. In the simplest case, a constant pressing force is applied, and the mat is simultaneously heated by means of a constant-power energy source. However, both the inputting of energy and compression by means of a pressing force can take place at respectively different times and in a plurality of stages. The inputting of energy in method step c) can be carried out by heat transfer from heated surfaces, for example press plates, to the mat. The inputting of energy in method step c') can be carried out by high-frequency heating (by applying a high-frequency electrical field) or by a combination of high-frequency heating and heat transfer from heated surfaces.

This pressing can be carried out by any methods known to the person skilled in the art (cf. "MDF—Mitteldichte Faserplatten [Medium-Density Fiberboards]" H.-J. Deppe, K. Ernst, 1996, DRW-Verlag Weinbren-ner, *Leinfelden Echterdingen*, pp. 93 to 104). Optionally continuous pressing methods, for example using double band presses, are used.

During or after pressing the mat in step c) and/or during or after pre-compressing the mat before step c) a high-frequency electrical field may be applied.

When step c') involves a combination of high-frequency heating and heat transfer from heated surfaces or plates the heated press surfaces or plates preferably have temperatures from in the range of from 80 to 200° C., more preferably from 90 to 180° C., most preferably from 100 to 150° C.

Preferred is a process of the present invention, wherein in said step c') of applying a high-frequency electrical field the temperature at the center of the pressed mat is increased to a maximum temperature in the range of from 80° C. to 200° C., preferably in the range of from 80° C. to 180° C., wherein preferably the maximum temperature is reached in less than 40 s·(d/mm) after the start of applying a high-frequency electrical field, where d is the thickness of the compacted mixture in mm at the end of step c'), more preferably in less than 30 s·(d/mm), even more preferably in less than 20 s·(d/mm), most preferably in less than 15 s·(d/mm) after the start of applying a high-frequency electrical field, where d is the thickness of the pressed mat in mm at the end of step c'). E.g., if the thickness d of the compacted mixture in mm at the end of step c') is 10 mm, the maximum temperature is preferably reached in less than 400 s, more preferably in less than 300 s, even more preferably in less than 200 s, most preferably in less than 150 s after the start of applying a high-frequency electrical field.

The term "center of the pressed mat" as used in this text designates the location which is approximately in the middle between the surfaces of the three-dimensional object defined by the pressed mat in step c) or c).

Component A and component B can be added to the lignocellulosic fibers, in step a) either
- a1) separately from one another or
- a2) as a mixture, preferably separately from one another.

Component B may also be not present.

An addition of components A and B separately from one another is understood here to mean that component A and component B are added to the lignocellulosic fibers in step a) with the aid of separate application devices, for example nozzles or applicator disks. The application devices may be arranged spatially in such a way or in such a time sequence that the addition of component A and component B is effected successively, in any sequence, or simultaneously. Optionally the application devices are arranged such that component A and component B are added simultaneously but not as a mixture to the lignocellulosic fibers. In general, this is achieved by virtue of the application devices being in immediate spatial proximity, e.g. the distance between the application devices may be between 1 cm and 300 cm, preferably between 5 cm and 200 cm, more preferably between 10 cm and 100 cm. Optionally the application devices may also be aligned here such that the components mix partly or completely even when they are on the way from the application devices to the lignocellulosic fibers.

If the optional component C is used in step a), addition of component A and component B as a mixture may mean that
- a) components A and B are added as a mixture and component C is added separately, or
- b) components A and B and C are added as a mixture.

If the optional component C is used in step a), addition of component A and component B separate from one another may mean that
- a) components A and C are added as a mixture and component B is added separately, or
- b) components B and C are added as a mixture and component A is added separately, or
- c) all components A and B and C are added separately.

When components A, optionally premixed with component C, and component B, optionally premixed with component C are added as a mixture, the resulting mixture is added to the lignocellulosic fibers after a waiting time of less than 120 min, preferably 90 min or less than 90 min, preferably 60 or less than 60 min, preferably 40 or less than 40 min, preferably 20 or less than 20 min, more preferably 10 or less than 10 min, 5 or most preferably less than 5 min, 1 or less than 1 min. Waiting time is the time period between the mixing and the addition to the lignocellulosic fibers and may be at least 30 sec. During the waiting time the mixture of might be exposed to a temperature of 10 to 50° C., preferably 15 to 40° C., preferably 20 to 30° C.

A further aspect of the present invention relates to the use of the lignocellulosic fiber boards made from fibers.

In a further preferred use, the lignocellulose-based fiber boards are coated on one or more sides, for example, with melamine films, with veneers, with a plastic edge or with paint.

Optionally the lignocellulose-based fiber boards are used as inner plies for sandwich materials. In this case, the outer plies of the sandwich materials may consist of different materials, for example of metal such as aluminum or stainless steel, or of thin wood-based chipboards or fiberboards, preferably high-density fiberboards (HDF), or of laminates, for example high-pressure laminate (HPL).

Examples of uses of the lignocellulose-based fiber boards or of the coated lignocellulose-based fiber boards produced therefrom or of the sandwich materials produced therefrom are as material for furniture, for example as material for cabinet side, as shelf in cabinets, as material for bookshelves, as furniture door material, as countertop, as kitchen unit front, as elements in tables, chairs and/or upholstered furniture. Examples of uses of the lignocellulose-based fiber boards or of the coated lignocellulose-based fiber boards produced therefrom or of the sandwich materials produced therefrom are as building and/or construction material, for example as material for interior fit-out, shopfitting and exhibition stand construction, as material for roof and/or wall paneling, as infill, cladding, floors and/or inner layers of doors, and/or as separating walls.

Examples of uses are as fiber boards are for furniture, for example as construction material for cabinets, as shelves, as furniture door material, as countertop, as kitchen unit front, and/or as elements in tables, Examples of uses are as building and construction material, for example as material for interior fit-out, shopfitting and/or exhibition stand construction, as material for roof and/or wall paneling, as infill, cladding, floors and/or inner layers of doors, and/or as separating walls, as material for car ports and/or for hall roofs.

BRIEF DESCRIPTION OF FIGURE

FIG. 1: HDF boards, 4 mm, binder amount 6 wt.-% (solid/dry wood), press time factor=10 sec/mm, ratio of polylysine in binder is defined as weight ratio of Polylysine-4 (solids) to the sum of Polylysine-4 (solids) and glucose (solids). FIGURE shows the influence of the amount of polylysine on the in internal bond.

MATERIALS

Hydroxyaceton, Alfa Aesar
Glucose monohydrate, Sigma Aldrich, Spain
L-Lysine solution (50% in water), ADM animal nutrition, USA
Spruce wood chips and fibers from Germany, Institut für Holztechnologie Dresden
Spruce Wood Chips The chips were produced in a disc chipper. Spruce trunk sections (length 250 mm) from Germany were pressed with the long side against a rotating steel disc, into which radially and evenly distributed knife boxes are inserted, each of which consists of a radially arranged cutting knife and several scoring knives positioned at right angles to it. The cutting knife separates the chip from the round wood and the scoring knives simultaneously limit the chip length. Afterwards the produced chips are collected in a bunker and from there they are transported to a cross beater mill (with sieve insert) for re-shredding with regard to chip width. Afterwards the reshredded chips were conveyed to a flash drier and dried at approx. 120° C. The chips were then screened into two useful fractions (B: ≤2.0 mm×2.0 mm and >0.32 mm×0.5 mm, C: ≤4.0 mm×4.0 mm and >2.0 mm×2.0 mm), a coarse fraction (D: >4.0 mm×4.0 mm), which is reshreded, and a fine fraction (A: ≤0.32 mm×0.5 mm).

A mixture of 60 wt.-% of fraction B and 40 wt.-% of fraction C is used either as chips for single-layered chipboards.

Spruce Wood Fibers

The pulp was produced in a laboratory refining plant. An integrated steep conveyor transported the chips made from German spruce into the plant's preheater. Directly from the preheater, a continuously operating plug screw with integrated dewatering (MSD-Multi Screw Device) conveyed the material to be defibered into the pressure area of the plant. The material to be defibered was then plasticized in the digester at a digestion pressure of 9 bar under constant movement (3-4 min dwell time) and continuously conveyed to the refiner via a discharge screw and defibered. From the refiner, the fibers came via the tangential outlet and the blowline to the flash tube dryer and were dried.

Methods:

Measured Values and Measuring Methods

Residual Particle Moisture Content:

The moisture content of the particles (chips or fibers) before application of the binder (was measured according to EN 322:1993 by placing the particles in a drying oven at a temperature of (103±2) ° C. until constant mass has been reached.

The water content of the particle/binder composition mixtures obtained in step a) is determined in an analogous manner. For this, a sample of the respective mixture (ca. 20 g) is weighed in moist condition ($m_1$) and after drying ($m_0$). The mass $m_0$ is determined by drying at 103° C. to constant mass. Water content is calculated as follows: water content [in wt.-%]=[($m_1-m_0$)/$m_0$]·100.

Press Time Factor:

The press time factor is the press time, which is the time from closing to opening of the press, divided by the target thickness of the board. The target thickness refers to the board at the end of pressing step c) and is adjusted by the press conditions, i.e. by the distance between the top and bottom press plate, which is adjusted by inserting two steel spacing strips in the press.

Press time factor [sec/mm]=time from closing to opening of the press [sec]: target thickness of the pressed board [mm]. For example, when a 10 mm chipboard is made with a press time of 120 sec, a press time factor of 12 sec/mm results.

Density of the Boards:

The density of the boards was measured according to EN 323:1993 and is reported as the arithmetic average of ten 50×50 mm samples of the same board.

Transverse Tensile Strength of the Boards ("Internal Bond"):

Transverse tensile strength of the boards ("internal bond") was determined according to EN 319:1993 and is reported as the arithmetic average of ten 50×50 mm samples of the same board.

Swelling in Thickness:

Swelling in thickness after 24 h of the boards ("24 h swelling") was determined according to EN 317:1993 and is reported as the arithmetic average of ten 50×50 mm samples of the same board Binder Amount:

The binder amounts in the examples according to the present invention are reported as the total weight of the sum of the respective binder components polymer(s) A1 and component B1 in wt.-% based on the total dry weight of the wood particles (chips or fibers).

The binder amounts in the comparative examples are reported as the total weight of the sum of all binder components in wt.-% (dry weight, which is the weight of the components without any water) based on the total dry weight of the wood particles (chips or fibers).

Primary and secondary amine group amine group nitrogen content $NC_{ps}$:

The $NC_{ps}$ are measured by potentiometric titration according to EN ISO 9702:1998. The $NC_{ps}$ mean the weight of nitrogen of the primary and secondary amine groups per 100 g of polymer(s) A1 (given in wt.-%).

Determination of the weight-average molecular weight $M_w$:

$M_w$ was determined by size exclusion chromatography under the following conditions:

Solvent and eluent: 0.1% (w/w) trifluoroacetate, 0.1 M NaCl in distilled water
Flow: 0.8 ml/min
Injection volume: 100 µl
Samples are filtrated with a Sartorius Minisart RC 25 (0,2 µm) filter
Column material: hydroxylated polymethacrylate (TSK-gel G3000PWXL)
Column size: inside diameter 7.8 mm, length 30 cm
Column temperature: 35° C.
Detector: DRI Agilent 1100 UV GAT-LCD 503 [232 nm]
Calibration with poly(2-vinylpyridine) standards in the molar mass range from 620 to 2890000 g/mole (from PSS, Mainz, Germany) and pyridine (79 g/mol)
The upper integration limit was set to 29.01 mL
The calculation of $M_w$ includes the lysine oligomers and polymers as well as the monomer lysine.

The residual lysine monomer content of the polylysine solution was determined by HPLC/MS analysis under the following conditions:

Injection volume: 10 µl
Eluent A: water+0.02% formic acid
Eluent B: water
Gradient

| time [min] | Eluent A [%] | Eluent B [%] |
|---|---|---|
| 0 | 0 | 100 |
| 10 | 100 | 0 |
| 15 | 100 | 0 |
| 15.1 | 0 | 100 |
| 25 | 0 | 100 |

Switching from Eluent A to Eluent B after 15 min
Flow: 0.8 ml/min
Column HPLC: Primesep C, 250×3.2 mm, 5 µm
Column temperature: 30° C.
Calibration with solution of L-lysine in water
Mass spectrometer: Bruker Maxis (q-TOF)
MS conditions:
 Ionization mode: ESI, negative
 Capillary: 3500 V
 Nebulizer: 1,4 bar
 Dry gas: 8 l/min
 Temperature: 200° C.
 analyzed ion: 145.0983 [M-H]⁻±0.005 amu.

The residual lysine monomer content in Polymer A1 is given as wt.-% monomer based on the total weight of polylysine including the lysine monomer. For instance, the 50 wt.-% solution of Polylysine-5 with a lysine monomer content of 2.0 wt.-% contains 1 wt. % lysine monomer and 49% wt.-% lysine polymer comprising at least 2 condensed lysine units.

Determination of ratio of ε-linkages to α-linkages in polylysine ("ratio ε/α"):

This ratio s/(can be determined by integration of the signals for —CH—NH$_2$ and —CH—NH (α-linked) and —CH$_2$—NH$_2$ and —CH$_2$—NH (ε-linked) in the $^1$H-NMR spectra of the polylysines. The NMR signals are as-signed by an $^1$H, $^{15}$N-HMBC experiment (Heteronuclear Multiple Bond Correlation).

Abbreviations

HA=Hydroxyaceton, PL=Polylysine, Glu=Glucose

EXAMPLES

Example 1

Synthesis of Polylysines 1-8

2200 g of L-lysine solution (50 wt.-% in water, ADM) was heated under stirring in an oil bath (external temperature 140° C.). Water was distilled off and the oil bath temperature was increased by 10° C. per hour until a temperature of 180° C. is reached. The reaction mixture was stirred for an additional hour at 180° C. (oil bath temperature) and then pressure was slowly reduced to 200 mbar. After reaching the target pressure, distillation was continued for another period of time t (as specified in the following Table 1). The product was hotly poured out of the reaction vessel, crushed after cooling and dissolved in water to give a 50 wt.-% solution.

Residual lysine monomer content, NC$_{ps}$ and M$_w$ values were determined from this solution without any further purification. The residual lysine monomer is included in the calculation of M$_w$.

TABLE 1 synthesis and analytic data of the different Polylysine

| Polylysine | t [min] | Mw [g/mol] | NCps [wt. - %] | L-Lysine monomer content [wt. - %]* | ratio ε/α |
|---|---|---|---|---|---|
| Polylysine-1 | 120 | 1880 | 10.6 | 5.8 | 2.0 |
| Polylysine-2 | 150 | 2600 | 10.0 | 2.6 | 2.2 |
| Polylysine-3 | 180 | 3050 | 9.66 | 2.1 | 2.3 |
| Polylysine-4 | 210 | 3590 | 9.26 | 1.3 | 2.3 |
| Polylysine-5 | 255 | 5360 | 7.81 | 0.7 | 2.2 |
| Polylysine-6 | 285 | 6690 | 6.76 | 0.4 | 2.3 |
| Polylysine-7 | 300 | 9430 | 4.59 | 0.3 | 2.3 |
| Polylysine-8 | 330 | 11080 | 3.27 | 0.3 | 2.3 |

*The residual lysine monomer content is given as wt. - % based on the total weight of polylysine including lysine monomer.

Example 2

HDF boards (4 mm) with different polylysines (Polylysine-1 to Polylysine-8) and lysine Preparation of the resinated fibers (examples 2-1 to 2-8)
In a mixer, 120 g of Polylysine-X solution (50 wt.-% in water) was sprayed onto 1.04 kg (1.0 kg dry weight) of spruce fibers (moisture content 4.1%) while mixing. After addition mixing was continued for 3 min.

Preparation of the Resinated Fibers (Examples 2-0)

In a mixer, 120 g of lysine solution (50 wt.-% in water) was sprayed onto 1.04 kg (1.0 kg dry weight) of spruce fibers (moisture content 4.1%) while mixing. After addition mixing was continued for 3 min.

Pressing the Resinated Fibers to Fiberboards

Immediately after resination 336 g of the resinated fibers were scattered into a 30×30 cm mold and pre-pressed under ambient conditions (0.4 N/mm2). Subsequently, the pre-pressed fiber mat thus obtained was removed from the mold, transferred into a hot press and pressed to a thickness of 4 mm to give a HDF (temperature of the press plates 210° C., max pressure 4 N/mm$^2$). The pressing time was 40 s.

TABLE 2

HDF boards, 4 mm, binder amount 6 wt. - % (solid/dry wood), press time factor = 10 sec/mm.

| Example | polymer(s) A1 | Mw [g/mol] | internal bond [N/mm$^2$] | swelling 24 h [%] | density [kg/m$^3$] |
|---|---|---|---|---|---|
| 2-0 | Lysine* | 146 | | no boards | |
| 2-1 | PL-1 | 1880 | 0.77 | 0.38 | 801 |
| 2-2 | PL-2 | 2600 | 0.86 | 0.33 | 786 |
| 2-3 | PL-3 | 3050 | 0.93 | 0.34 | 800 |
| 2-4 | PL-4 | 3590 | 1.21 | 0.32 | 806 |
| 2-5 | PL-5 | 5360 | 1.20 | 0.32 | 801 |
| 2-6 | PL-6 | 6690 | 1.15 | 0.31 | 799 |
| 2-7 | PL-7 | 9430 | 0.94 | 0.34 | 803 |
| 2-8 | PL-8 | 11080 | | no boards | |

*Lysine was used instead of polymer(s) A1, PL = Polylysine

Example 3

HDF boards (2 mm) with Polylysine-4

Preparation of the Resinated Fibers

In a mixer, 120 g of Polylysine-4 solution (50 wt.-% in water) was sprayed onto 1.04 kg (1.0 kg dry weight) of spruce fibers (moisture content 4.1%) while mixing. After addition mixing was continued for 3 min.

Pressing the Resinated Fibers to Fiberbaords:

Immediately after resination 168 g of the resinated fibers were scattered into a 30×30 cm mold and pre-pressed under ambient conditions (0.4 N/mm2). Subsequently, the pre-pressed fiber mat thus obtained was removed from the mold, transferred into a hot press and pressed to a thickness of 2 mm to give a HDF (temperature of the press plates 210° C., max pressure 4 N/mm$^2$). The pressing time was 20 s.

TABLE 3

HDF board, 2 mm binder amount 6 wt. - % (solid/dry wood), press time factor = 10 sec/mm.

| Example | Polymer(s) A1 | Mw | internal bond [N/mm$^2$] | swelling 24 h [%] | density [kg/m$^3$] |
|---|---|---|---|---|---|
| 3-1 | Polylysine-4 | 3590 | 1.28 | 0.40 | 809 |

Example 4

HDF boards (4 mm) with different ratios of Polylysin-4 and glucose/hydroxyacetone Preparation of the Resinated Fibers In a mixer, Y g of Polylysine-4 (PL-4) solution (50-wt.-% in water) was sprayed onto 1.04 kg (1.00 kg dry weight) of spruce fibers (moisture content 4.1%) while mixing. Subsequently, Z g of a glucose solution (50 wt.-% in water) or X g of a hydroxyaceton solution (50 wt.-% in water) was sprayed onto the mixture while mixing (Y, Z and X are given in table 4). After addition, mixing was continued for 3 min.

TABLE 4

Amounts of binder for Example 4-1 to Example 4-8

| | Polymer A1 | | Component B1 | |
|---|---|---|---|---|
| Example | amount PL-4 solution (Y) [g] | ratio of PL in binder** [%] | amount Glu solution (Z) [g] | amount HA solution (X) [g] |
| 4-1 | 120 | 100 | 0 | 0 |
| 4-2 | 110 | 91.6 | 10 | 0 |
| 4-3 | 100 | 83.3 | 20 | 0 |
| 4-4 | 80 | 66.7 | 40 | 0 |
| 4-5 | 60 | 50.0 | 60 | 0 |
| 4-6 | 40 | 33.0 | 80 | 0 |
| 4-7 | 20 | 16.7 | 100 | 0 |
| 4-8 | 0 | 0 | 120 | 0 |
| 4-9 | 92 | 76.6 | 0 | 28 |
| 4-10 | 92 | 100 | 0 | 0 |

**weight ratio of A1 to (A1 + B1) based on solids

Pressing the Resinated Fibers:

Immediately after resination 336 g of the resinated fibers were scattered into a 30×30 cm mold and pre-pressed under ambient conditions (0.4 N/mm2). Subsequently, the pre-pressed fiber mat thus obtained was removed from the mold, transferred into a hot press and pressed to a thickness of 4 mm to give a HDF (calculated density of 800 kg/m$_3$) (temperature of the press plates 210° C., max pressure 4 N/mm$^2$).

The pressing time was 40 s.

Example 5

HDF boards (4 mm) with different amounts of Polylysine-6 and glucose as comparative example (EP 3611225A2, Example 9 and 11, table 4)

Preparation of the Resinated Fibers

Example 5-0

In a mixer, 100 g of Polylysine-6 solution (50 wt.-% in water) was sprayed onto 1.04 kg (1.0 kg dry weight) of spruce fibers (moisture content 4.1%) while mixing. Subsequently, 20 g of a glucose solution (50 wt.-% in water) was sprayed onto the mixture while mixing. After addition mixing was continued for 3 min.

Comparative Example 5-1

In a mixer, 60 g of Polylysine-6 solution (50 wt.-% in water) was sprayed onto 1.04 kg (1.0 kg dry weight) of spruce fibers (moisture content 4.1%) while mixing. Subsequently, 60 g of a glucose solution (50 wt.-% in water) was sprayed onto the mixture while mixing. After addition mixing was continued for 3 min.

Comparative Example 5-2

In a mixer, 20 g of Polylysine-6 (PL-6) solution (50 wt.-% in water) was sprayed onto 1.04 kg (1.0 kg dry weight) of spruce fibers (moisture content 4.1%) while mixing. Subsequently, 100 g of a glucose solution (50 wt.-% in water) was sprayed onto the mixture while mixing. After addition mixing was continued for 3 min.

Pressing the Resinated Fibers:

Immediately after resination 336 g of the resinated fibers were scattered into a 30×30 cm mold and pre-pressed under ambient conditions (0.4 N/mm2). Subsequently, the pre-pressed fiber mat thus obtained was removed from the mold, transferred into a hot press and pressed to a thickness of 4 mm to give a HDF (temperature of the press plates 210° C., max pressure 4 N/mm$^2$). The pressing time was 40 s.

TABLE 5

HDF boards, 4 mm binder amount mainly 6 wt.-% (solid/dry wood), press time factor = 10 sec/mm

| Example | Polymer(s) A1 | amount PL-4 [wt.-%]** | amount Glu [wt.-%]** | amount HA [wt.-%]** | ratio of PL in binder*** [%] | internal bond [N/mm$^2$] | swelling 24 h [%] | density [kg/m''] |
|---|---|---|---|---|---|---|---|---|
| 4-1 | PL-4 | 6.0 | 0.0 | | 100 | 1.21 | 0.32 | 806 |
| 4-2 | PL-4 | 5.5 | 0.5 | | 91.7 | 1.20 | 0.32 | 796 |
| 4-3 | PL-4 | 5.0 | 1.0 | | 83.3 | 1.18 | 0.34 | 800 |
| 4-4 | PL-4 | 4.0 | 2.0 | | 66.7 | 1.05 | 0.34 | 808 |
| 4-5 | PL-4 | 3.0 | 3.0 | | 50.0 | 0.71 | 0.37 | 778 |
| 4-6 | PL-4 | 2.0 | 4.0 | | 33.3 | 0.68 | 0.48 | 820 |
| 4-7 | PL-4 | 1.0 | 5.0 | | 16.7 | no boards | | |
| 4-8 | PL-4 | 0.0 | 6.0 | | 0 | no boards | | |
| 4-9 | PL-4 | 4.6 | | 1.4 | 76.7 | 1.07 | 0.33 | 799 |
| 4-10 | PL-4 | 4.6 | | | 100 | 1.09 | 0.34 | 809 |

** based on solid per dry wood
***weight ratio of A1 to (A1 + B1) based on solids

TABLE 6

HDF boards, 4 mm, binder amount 6 wt.-% (solid/dry wood),
press time factor = 10 sec/mm.

| Example | Polymer(s) A1 | amount PL-6 [wt.-%]** | amount Glucose [wt.-%]** | ratio of PL in binder*** [%] | internal bond [N/mm2] | swelling 24 h [%] | density [kg/m³] |
|---|---|---|---|---|---|---|---|
| 5-0 | PL-6 | 5.0 | 1.0 | 83.3 | 1.07 | 0.35 | 804 |
| 5-1 | PL-6 | 3.0 | 3.0 | 50.0 | 0.64 | 0.41 | 781 |
| 5-2 | PL-6 | 1.0 | 5.0 | 16.7 | no boards | | |

**based on solid per dry wood
***weight ratio of A1 to (A1 + B1) based on solids Example 6

Single-layered chipboards with different polymer(s) A1
Preparation of the Resinated Chips In a mixer 648 g of Polylysine-X solution (50 wt.-% in water) was sprayed onto 5.56 kg (5.40 kg dry weight) of spruce wood chips (moisture content 3.0%) while mixing. Subsequently, 48.6 g of water was sprayed onto the mixture while mixing to adjust the final moisture of the resinated chips. After addition of the water mixing was continued for 3 min.

Pressing the Resinated Chips to Chipboards

Immediately after resination, 1.10 kg of the chips/binder mixture were scattered into a 30×30 cm mold and pre-pressed under ambient conditions (0.4 N/mm²). Subsequently, the pre-pressed chip mat thus obtained was removed from the mold, transferred into a hot press and pressed to a thickness of 16 mm to give a chipboard (temperature of the press plates 210° C., max pressure 4 N/mm²). The pressing time was 160 sec.

TABLE 7 chipboards 16 mm binder amount 6 wt. - % (solid/
dry wood), press time factor = 10
sec/mm pressed with different Polylysine

| Example | polymer(s) A1 | Mw [g/mol] | internal bond [N/mm^2] | swelling 24 h [%] | density [kg/m^3] |
|---|---|---|---|---|---|
| 6-1 | Polylysine-1 | 1880 | no boards** | | |
| 6-2 | Polylysine-2 | 2600 | no boards** | | |
| 6-3 | Polylysine-3 | 3050 | no boards** | | |
| 6-4 | Polylysine-4 | 3590 | no boards** | | |
| 6-5 | Polylysine-5 | 5360 | no boards** | | |
| 6-6 | Polylysine-6 | 6690 | no boards** | | |
| 6-7 | Polylysine-7 | 9430 | no boards** | | |
| 6-8 | Polylysine-8 | 11080 | no boards** | | |

**"no board" means that the resulting material after pressing was not a sound chipboard andshowed fractures, blows and/or bursts Even the prolongation of the pressing time to 240 s did not lead to sound chipboards.

Surprisingly, it was found that fiber boards with good mechanical properties can be formed with polylysine, whereas chipboards cannot be formed with the same type and amount of polylysine binder.

The invention claimed is:

1. Use of a binder composition comprising
   component A comprising polymer(s) A1 and
   optionally component B comprising component B1 which is selected from the group consisting of monosaccharides, 5 disaccharides, hydroxyacetone, glycolaldehyde and mixtures thereof,
   wherein polymer(s) A1 consist(s) of polylysine(s) and has(have) a total weight average molecular weight $M_{w,\ total}$ of 800 g/mol to 10,000 g/mol,
   wherein the binder composition comprises 80 to 100 wt.-% polymer(s) A1, and 0 to 20 wt.-% component B1, based on the total weight of the sum of polymer(s) A1 and component B1, wherein the weight amounts of the polymer(s) A1 and component B1 are selected such that the total weight of the sum of polymer(s) A1 and component B1 is 100 wt.-%,
   for the preparation of a lignocellulosic fiber board, wherein 3 to 15 wt-% polymer(s) A1 and component B1 in total based on the total oven-dry weight of the lignocellulosic fibers are used for the preparation of the lignocellulosic composite article.

2. Use according to claim 1, wherein component B1 is selected from the group consisting
   of hydroxyacetone, 1,3-dihydroxyacetone, xylose, fructose, glucose, mannose, saccharose and mixtures thereof.

3. Use according to claim 1, wherein no compound B is included.

4. Use of a reacted Binder composition obtainable or obtained by reacting the binder components A and B and lignocellulosic fibers or reacting component A and lignocellulosic fibers as defined in claim 1, for the preparation of a lignocellulosic fiber board.

5. Use of a composition kit comprising the binder composition as defined in claim 1, wherein component A and component B are stored separately, for the preparation of a lignocellulosic fiber board.

6. A lignocellulosic fiber board comprising a plurality of lignocellulosic fibers, and a binder composition as defined claim 1, wherein 3 to 15 wt-% polymer(s) A1 and component B1 in total based on the total oven-dry weight of the lignocellulosic fibers are used for the preparation of the lignocellulosic composite article.

7. The lignocellulosic fiber board according to claim 6, having a thickness of 1.5 to 5 mm.

8. The lignocellulosic fiber board according to claim 6, having an internal bond strength of more than 0.8 N/mm².

9. A process for the batchwise or continuous production of lignocellulosic fiber boards
   which are multi-layered lignocellulose-based fiber boards with a core and with at least one upper and one lower surface layer, comprising the following steps:
   a) mixing of the lignocellulosic fibers with a binder composition for each layer, wherein the mixture for at least one layer comprises the binder composition as defined in claim 1,
   b) layer-by-layer scattering of the mixtures of the individual layers to form a mat, c) pressing the mat to a board at a temperature of 80 to 300° C. and at a pressure of 1 to 100 bar
wherein 3 to 15 wt.-% polymer(s) A1 and component B1 in total based on the total 20 oven-dry weight of the lignocellulosic fibers, are used for the preparation of the lignocellulose-based fiber boards.

10. A process for the batchwise or continuous production of single layered lignocellulosic fiber boards comprising the following steps:
 a) mixing of the lignocellulosic fibers with a binder composition, wherein the mixture comprises the binder composition as defined in claim 1,
 b) scattering of the mixtures to form a mat,
 c) pressing the mat to a board at a temperature of 80 to 300° C. and at a pressure of 1 to 100 bar or
 c') pressing the mat to a board at a temperature of 80 to 200° C. and at a pressure of 0.1 to 100 bar, wherein a high-frequency electrical field is applied during pressing until 80 to 200° C. is reached in the center of the mat
wherein 3 to 15 wt.-% polymer(s) A1 and component B1 in total based on the total oven-dry weight of the lignocellulosic fibers, are 5 used for the preparation of the lignocellulose-based fiber boards.

11. A process for the batchwise or continuous production of lignocellulosic fiber boards which are multi-layered lignocellulose-based fiber boards with a core and with at least one upper and one lower surface layer, comprising the following steps:
 a) mixing of the lignocellulosic fibers with a binder composition for each layer, wherein the mixture for at least one layer comprises the binder composition as defined in claim 1,
 b) layer-by-layer scattering of the mixtures of the individual layers to form a mat,
 c) pressing the mat to a board at a temperature of 80 to 300° C. and at a pressure of 1 to 100 bar
wherein 3 to 15 wt.-% polymer(s) A1 and component B1 in total based on the total 20 oven-dry weight of the lignocellulosic fibers, are used for the preparation of the lignocellulose-based fiber boards,
wherein both components A and B of the binder composition as defined in claim 1 are added to the lignocellulosic pieces in step a) either
 a1) separately from one another or
 a2) as a mixture.

12. The process according to claim 9, wherein the lignocellulosic fibers are prepared from wood.

13. The process according to claim 10, wherein the boards obtained in step c) or step c') have an internal bond strength of more than 0.8 N/mm².

* * * * *